(12) United States Patent
Hirotani et al.

(10) Patent No.: US 9,571,017 B2
(45) Date of Patent: Feb. 14, 2017

(54) MOTOR DRIVE DEVICE

(71) Applicant: MITSUBISHI ELECTRIC CORPORATION, Tokyo (JP)

(72) Inventors: Yu Hirotani, Tokyo (JP); Yuji Takizawa, Tokyo (JP); Tatsuya Mori, Tokyo (JP); Isao Kezobo, Tokyo (JP); Yoshihiko Kimpara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 98 days.

(21) Appl. No.: 14/442,224

(22) PCT Filed: Feb. 12, 2013

(86) PCT No.: PCT/JP2013/053260
§ 371 (c)(1),
(2) Date: May 12, 2015

(87) PCT Pub. No.: WO2014/125568
PCT Pub. Date: Aug. 21, 2014

(65) Prior Publication Data
US 2016/0072416 A1    Mar. 10, 2016

(51) Int. Cl.
*H02P 6/10* (2006.01)
*H02P 21/00* (2016.01)
(Continued)

(52) U.S. Cl.
CPC ............... *H02P 6/10* (2013.01); *H02K 1/278* (2013.01); *H02P 21/0035* (2013.01);
(Continued)

(58) Field of Classification Search
CPC . B60L 11/1868; B60L 11/1887; B60L 11/005; B60L 11/14; B60L 11/1803; B60L 11/1892; B60L 2210/40; B60L 2210/46; B60L 2220/58; B60L 2240/70; B60L 3/0046; B60L 11/1861; B60L 15/02; Y02T 10/7066
(Continued)

(56) References Cited

U.S. PATENT DOCUMENTS 6,369,535 B1 *  4/2002  Wang ................ H02P 6/10
                                        318/400.23
6,710,495 B2 *  3/2004  Lipo ................. H02K 3/28
                                        310/184

(Continued)

FOREIGN PATENT DOCUMENTS

JP    08-205586 A    8/1996
JP    09-327139 A    12/1997
(Continued)

OTHER PUBLICATIONS

Machine Translation of JP 8-205586.
(Continued)

*Primary Examiner* — Paul Ip
(74) *Attorney, Agent, or Firm* — Sughrue Mion, PLLC; Richard C. Turner

(57) ABSTRACT

[Object] To effectively improve torque of a motor, the maximum rotation rate in driving with no load, and output at a high rotation rate, while suppressing torque ripple, noise, or vibration of the motor.
[Solution] A brushless motor 301 has an armature iron core 310 wound with armature windings including plural winding sets 311 and 312 each of which includes multi-phase windings. Voltage application means 302 applies voltages to the plural winding sets. Control means 303 calculates a voltage command for the plural winding sets, and controls the voltage application means based on the voltage command. The control means 303 controls the voltage application means 302 so that induced voltages generated in the plural winding sets by rotation of the brushless motor have (Continued)

a trapezoidal waveform and a phase difference between the voltages for the plural winding sets becomes a value that reduces torque ripple caused by the induced voltages.

24 Claims, 24 Drawing Sheets

(51) Int. Cl.
 H02K 1/27 (2006.01)
 H02P 25/22 (2006.01)
 H02P 29/02 (2016.01)
 H02P 21/05 (2006.01)
 H02P 25/02 (2016.01)
(52) U.S. Cl.
 CPC ............ *H02P 21/05* (2013.01); *H02P 25/022* (2013.01); *H02P 25/22* (2013.01); *H02P 29/02* (2013.01)
(58) Field of Classification Search
 USPC ........ 318/400.02, 400.41, 440, 441; 363/133
 See application file for complete search history.

(56) References Cited

U.S. PATENT DOCUMENTS

| | | | | |
|---|---|---|---|---|
| 6,828,752 | B2* | 12/2004 | Nakatsugawa | H02P 6/10 318/727 |
| 7,847,437 | B2* | 12/2010 | Chakrabarti | B60L 11/1887 307/82 |
| 7,956,563 | B2* | 6/2011 | Perisic | B60L 11/1868 180/65.1 |
| 7,990,098 | B2* | 8/2011 | Perisic | B60L 11/1868 318/432 |
| 8,002,056 | B2* | 8/2011 | Chakrabarti | B60K 11/02 180/65.1 |
| 8,054,032 | B2* | 11/2011 | Chakrabarti | B60L 11/1868 180/65.1 |
| 2003/0085627 | A1* | 5/2003 | Lipo | H02K 3/28 310/12.22 |
| 2004/0056632 | A1* | 3/2004 | Nakatsugawa | H02P 6/10 318/801 |
| 2006/0192511 | A1 | 8/2006 | Kataoka et al. | |
| 2009/0033156 | A1* | 2/2009 | Chakrabarti | B60L 11/1887 307/82 |
| 2009/0033251 | A1* | 2/2009 | Perisic | B60L 11/1868 318/105 |
| 2009/0033255 | A1* | 2/2009 | John | B60L 11/1868 318/139 |
| 2009/0033274 | A1* | 2/2009 | Perisic | B60L 11/1868 318/771 |
| 2009/0034303 | A1* | 2/2009 | Chakrabarti | B60L 11/1868 363/71 |
| 2009/0034308 | A1* | 2/2009 | Welchko | B60L 11/1868 363/133 |
| 2010/0019708 | A1 | 1/2010 | Okubo | |
| 2010/0295403 | A1 | 11/2010 | Morita et al. | |
| 2012/0049782 | A1 | 3/2012 | Suzuki | |

FOREIGN PATENT DOCUMENTS

| | | |
|---|---|---|
| JP | 2000-041392 A | 2/2000 |
| JP | 3259805 B2 | 2/2002 |
| JP | 2006-174692 A | 6/2006 |
| JP | 2008-271652 A | 11/2008 |
| JP | 2011-004583 A | 1/2011 |
| JP | 2011-061998 A | 3/2011 |
| JP | 2012-050252 A | 3/2012 |

OTHER PUBLICATIONS

Machine Translation of JP 2011-4583.
Machine Translation of JP 9-327139.
Machine Translation of JP 2008-271652.
Machine Translation of JP 2000-41392.
Machine Translation of JP 2012-50252.
Communication dated Jul. 7, 2015 from the Japanese Patent Office in counterpart application No. 2015-500020.
International Search Report of PCT/JP2013/053260 dated May 21, 2013 [PCT/ISA/210].
Communication dated Oct. 12, 2016 from the European Patent Office in counterpart Application No. 13874937.9.

* cited by examiner

THREE PHASE Δ CONNECTION (DUPLEX)    THREE PHASE Y CONNECTION (DUPLEX)

(a) THREE-PHASE VOLTAGE COMMANDS
(SOLID LINE: AFTER HARMONIC SUPERIMPOSITION, DASHED LINE: BEFORE SUPERIMPOSITION)

(b) LINE-TO-LINE VOLTAGES
(SOLID LINE: AFTER HARMONIC SUPERIMPOSITION, DASHED LINE: BEFORE SUPERIMPOSITION)

MOTOR DRIVE DEVICE

CROSS REFERENCE TO RELATED APPLICATIONS

This application is a National Stage of International Application No. PCT/JP2013/053260, filed Feb. 12, 2013, the contents of which are incorporated herein by reference in its entirety.

TECHNICAL FIELD

The present invention relates to a motor drive device for driving a multiplex winding motor used in, for example, an electric power steering device.

BACKGROUND ART

Regarding a brushless motor, there is known a method of adjusting induced voltage for each phase into a trapezoidal wave in which an odd-order harmonic is superimposed on a fundamental wave, thereby improving output and efficiency as compared to the case of using a fundamental wave alone.

Patent Document 1 proposes a method of adjusting induced voltage for each phase into a trapezoidal wave in which an odd-order harmonic is superimposed, thereby improving torque.

In this document, induced voltage adjustment means superimposes a third-order harmonic on induced voltage having a sine waveform which is a fundamental wave, thereby adjusting induced voltage for each phase into a trapezoidal waveform.

As a result, the shape of a part surrounded by a characteristic curve of induced voltage for each phase with respect to a rotor rotation angle, and the horizontal axis (rotation angle), becomes a shape that is flattened and broadened as compared to the case of a characteristic curve based on a fundamental wave alone, whereby motor generated torque increases.

Patent Document 2 describes that induced voltage of a motor is set to have a waveform containing a third-order harmonic, whereby motor output can be improved as compared to the case of sine wave, while vibration and noise are reduced.

CITATION LIST

Patent Document

Patent Document 1: Japanese Laid-Open Patent Publication No. 2006-174692
Patent Document 2: Japanese Laid-Open Patent Publication No. 2011-61998

SUMMARY OF THE INVENTION

Problems to be Solved by the Invention

In Patent Document 1, although a trapezoidal wave in which an odd-order harmonic is contained on a fundamental wave is used as an induced voltage waveform, any essential measures are not disclosed for torque ripple due to harmonic components other than a third-order component in a three-phase motor.

In Patent Document 2, a trapezoidal waveform containing at least a third-order harmonic is used as an induced voltage waveform. However, induced voltage of a third-order harmonic becomes a factor for occurrence of circulating current. In addition, it is generally difficult to contain only a third-order harmonic on a fundamental wave in induced voltage of a motor, and torque ripple caused when other harmonic components occur is not addressed at all.

The present invention is to solve the above problems and to provide a motor drive device capable of, while suppressing torque ripple, noise, and vibration in a multiplex winding motor such as a brushless motor, effectively improving torque of the motor, the maximum rotation rate in driving with no load, and output at a high rotation rate.

Solution to the Problems

A motor drive device according to the present invention includes: a multiplex winding motor having an armature iron core wound with armature windings including a plurality of winding sets each of which includes windings for a plurality of phases; voltage application means for applying voltages to the plurality of winding sets; and control means for calculating a voltage command for the plurality of winding sets and controlling the voltage control means based on the voltage command, wherein the control means controls the voltage application means so that induced voltages generated in the plurality of winding sets by rotation of the multiplex winding motor each have a trapezoidal waveform, and a phase difference between the voltages for the plurality of winding sets becomes a value that reduces torque ripple caused by the induced voltages.

Effect of the Invention

The present invention provides a novel significant effect of, while suppressing torque ripple, noise, and vibration in a multiplex winding motor such as a brushless motor, effectively improving torque of the motor, the maximum rotation rate in driving with no load, and output at a high rotation rate.

DESCRIPTION OF EMBODIMENTS

Hereinafter, embodiments of the present invention will be described based on the drawings.

Embodiment 1

Figure 1:
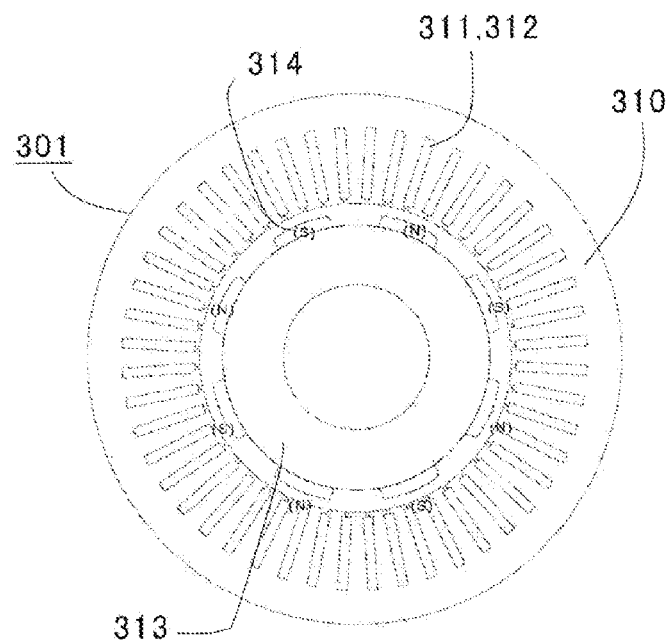
FIG. 1 is a sectional view showing an example of a brushless motor according to embodiment 1 of the present invention.
Figure 2:
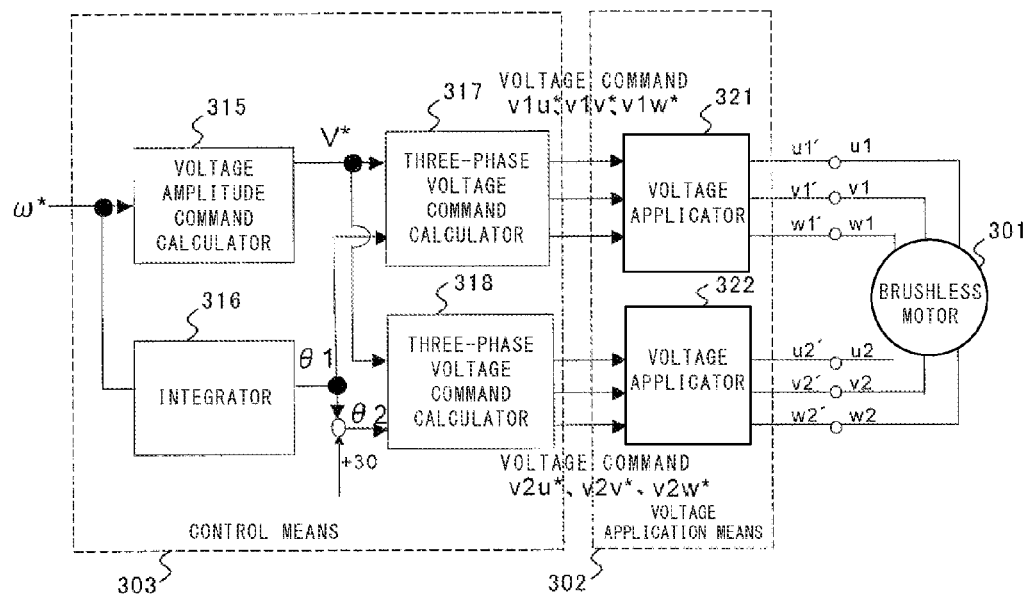
FIG. 2 is a block configuration diagram showing a motor drive device according to embodiment 1 of the present invention.

FIG. 1 is a sectional view showing the configuration of a brushless motor according to embodiment 1 of the present invention. FIG. 2 is a block diagram showing a motor drive device according to embodiment 1 of the present invention.

In FIG. 1, an armature of a brushless motor 301 which is a multiplex winding motor is formed by an armature iron core 310 having armature windings, and field poles are formed by a field pole iron core 313 having a plurality of permanent magnets 314.

The armature windings of the brushless motor 301 include a first winding set 311 and a second winding set 312 forming two three-phase winding groups that are not electrically connected. The winding sets of the armature windings are not electrically connected to each other. In the brushless motor 301 of the present embodiment, in the case where an angle occupied in a field-pole circumferential direction by a pair of N pole and S pole of the field poles is defined as an electric angle of 360 degrees, the second winding set 312 has a phase difference by 30 degrees relative to the first winding set 311.

In the case where an angle occupied in a field-pole circumferential direction by a pair of N pole and S pole of the field poles is defined as an electric angle of 360 degrees, the coil pitch of the windings is 180 degrees, that is, full pitch winding is used.

As shown in FIG. 2, voltage applicators 321 and 322 for applying voltages to the first winding set 311 and the second winding set 312 of the brushless motor 301 generate u1', v1', w1', and u2', v2', w2' as output voltages for the respective phases. In addition, u1', v1', w1' are connected to terminals of u1, v1, w1 of the first winding set 311, and u2', v2', w2' are connected to terminals of u2, v2, u2 of the second winding set 312.

That is, the voltage applicators 321 and 322 apply AC voltages (motor applied voltages) between lines u1-v1, v1-w1, w1-u1 and u2-v2, v2-w2, w2-u2 of the two winding sets 311 and 312, thereby driving the brushless motor 301.

Figure 3:
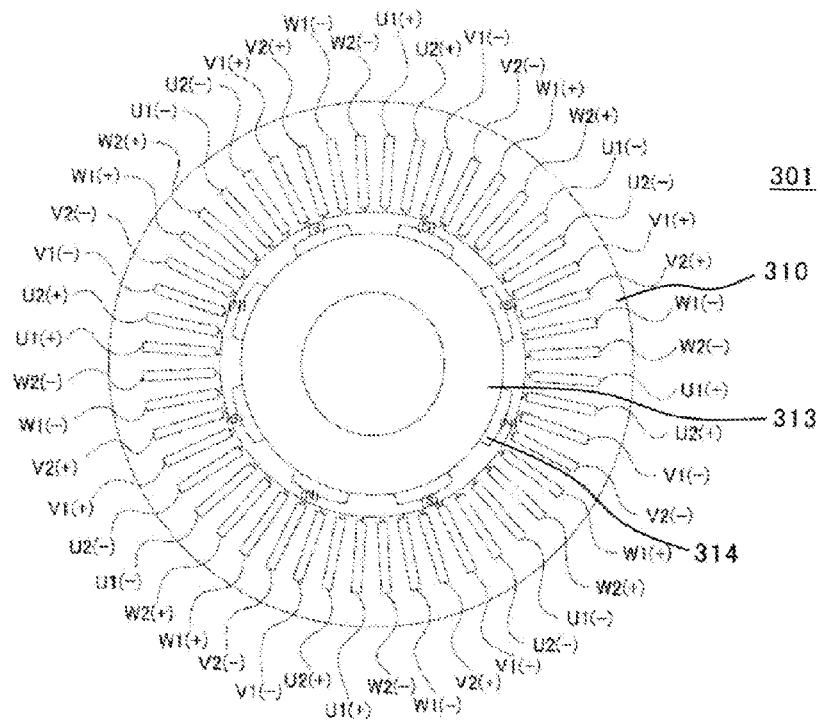
FIG. 3 is a sectional view showing a winding example of armature coils of the brushless motor according to embodiment 1 of the present invention.

FIG. 3 shows an example of winding of armature coils in the brushless motor 301 having such six phases of u1, u2, v1, v2, w1, and w2.

In FIG. 3, u1, u2, v1, v2, w1, and w2 indicate coils for the respective phases, and (+) and (−) indicate winding directions.

Figure 4:
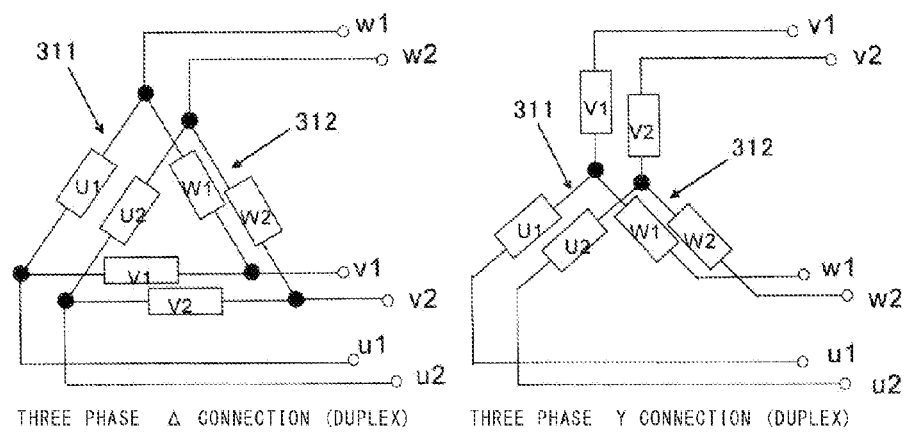
FIG. 4 is an explanation diagram showing a connection manner of armature windings of the brushless motor according to embodiment 1 of the present invention.

As shown in FIG. 4, these armature coils are three-phase connected by Δ or Y connection in each winding set.

As described above, the first winding set 311 (u1, v1, w1) and the second winding set 312 (u2, v2, w2) are not electrically connected to each other.

Voltage application means 302 is composed of the voltage applicators 321 and 322 corresponding to the respective winding sets, and supplies voltage to the brushless motor 301 by a power supply such as an inverter based on voltage commands v1u*, v1v*, v1w*, v2u*, v2v*, and v2w* outputted from control means 303.

The control means 303 will be described.

Based on a desired velocity ω* for the brushless motor 301, a voltage amplitude command calculator 315 calculates a voltage amplitude command V* before limitation so that, here, the voltage amplitude command V* is proportional to ω*.

V* corresponds to a line-to-line voltage amplitude.

An integrator 316 integrates the velocity command ω* and outputs a phase θ1 of a voltage command.

For the first winding set, a three-phase voltage command calculator 317 outputs the three-phase voltage commands v1u*, v1v*, and v1w* shown by the following expression, based on V* and the phase θ1.

$$\begin{cases} v1u^* = \frac{V^*}{\sqrt{3}} \cdot \sin(\theta1) \\ v1v^* = \frac{V^*}{\sqrt{3}} \cdot \sin(\theta1 - 120) \\ v1w^* = \frac{V^*}{\sqrt{3}} \cdot \sin(\theta1 + 120) \end{cases} \quad \text{[Mathematical 1]}$$

For the second winding set, a three-phase voltage command calculator 318 performs the same processing based on the voltage amplitude command V* after limitation and a phase θ2 of a voltage command.

It is noted that θ1 and θ2 have a phase difference by an electric angle of 30 degrees.

Figure 5:
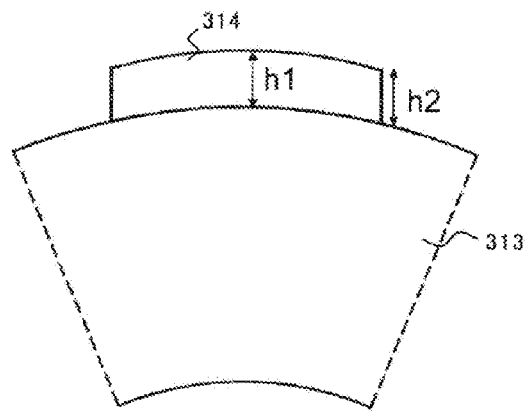
FIG. 5 is a partial enlarged view showing the configuration of one pole of field poles of the brushless motor according to embodiment 1 of the present invention.

Next, FIG. 5 shows an enlarged view of one pole of the field poles of the brushless motor 301 shown in FIG. 1.

The brushless motor 301 has a magnet attachment surface on a surface of the field pole iron core 313, and the permanent magnet 314 is attached to the magnet attachment surface by an adhesive agent or the like. The thickness at the center of the permanent magnet 314 is set at h1 and the thickness at ends of the permanent magnet 314 is set at h2.

Here, in the brushless motor 301 in FIG. 1, in the case where the motor has a symmetric structure for each magnetic pole, induced voltage E generated between lines u1-v1, v1-w1, w1-u1, u2-v2, v2-w2, and w2-u2 of the motor terminals shown in FIG. 2 by rotation of the field poles is represented by the following expression.

[Mathematical 2]

$$E(t) = E_{tp}\sin(\omega t) + \sum_{k=1}^{\infty} E_{(2k+1)p}\sin((2k+1)\omega t + \theta_{(2k+1)e}) \quad \text{Expression 1}$$

In the above expression, the induced voltage E is represented by a sum of a fundamental wave component and a (2k+1)-th order harmonic component (k is an integer equal to or greater than 1) having a frequency component that is (2k+1)-th order times the fundamental wave component.

$E_{1P}$ and $E_{(2k+1)P}$ denote peaks of waveforms for the respective orders, and $\theta_{(2k+1)e}$ denotes a phase difference between the fundamental wave component and the (2k+1)-th order harmonic component.

Figure 6:
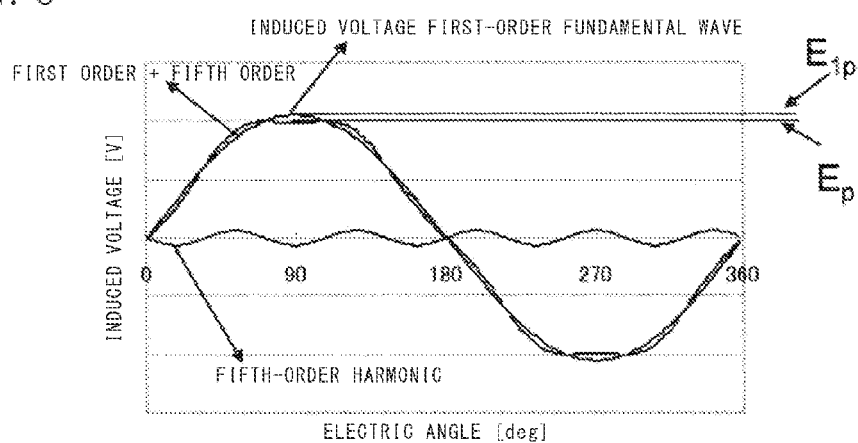
FIG. 6 is an explanation diagram showing an example of induced voltage waveforms according to embodiment 1 of the present invention.

Here, if an induced voltage peak is denoted by $E_P$, as is found from FIG. 6, $E_P$ is the maximum value, on the time axis, of voltage applied from outside between phases of the voltage applicators 321 and 322.

Here, regarding the maximum value of withstand voltage between phases of the voltage applicators 321 and 322, an upper limit value is determined depending on a switching element and a circuit element used in the voltage applicators 321 and 322, and if the withstand voltage is exceeded, failure of the voltage applicators may occur. Therefore, considering the upper limit value, it is desirable that the induced voltage peak $E_P$ is small.

On the other hand, torque T of the brushless motor 301 is represented by the following expression.
[Mathematical 3]

$$T \propto E_{1P}/\omega \quad \text{Expression 2}$$

Here, ω denotes an angular velocity of the brushless motor 301.

As shown in the above expression, torque of the brushless motor 301 is proportional to a fundamental wave component of the induced voltage E. Therefore, in order to improve the value of torque while suppressing the induced voltage peak $E_P$, it is necessary to improve $E_{1P}/E_P$, the ratio of the fundamental wave peak $E_{1P}$ to the induced voltage peak $E_P$.

Here, in the present embodiment, as the induced voltage E, a trapezoidal wave represented by a sum of a fundamental wave component, a fifth-order harmonic component, and other harmonic components is applied as shown in FIG. 6.

Such induced voltage E is represented as shown by the following expression.
[Mathematical 4]

$$E(t)=E_{1P}\sin(\omega t)+E_{5P}\sin(5\omega t+\theta_{5e})+E_{other} \quad \text{Expression 3}$$

Here, $E_{1P}$ and $E_{5P}$ are peaks of waveforms for the respective orders, $E_{other}$ is a sum of other odd-order harmonic components, and $\theta_{5e}$ is a phase difference between the fifth-order harmonic component and the fundamental wave component.

Next, change in $E_{1P}/E_P$ when $E_{5P}/E_{1P}$, i.e., an application ratio of the fifth harmonic component to the fundamental wave component of the induced voltage E is changed will be considered.

Figure 7:
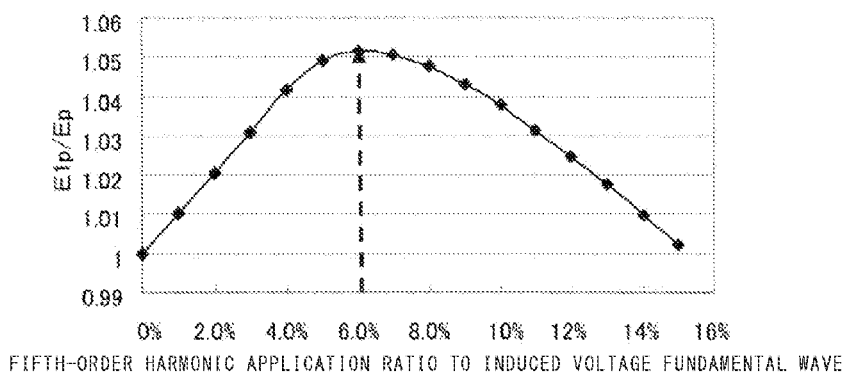
FIG. 7 is a graph showing the ratio of a fundamental wave peak of induced voltage to an induced voltage peak in the case where an application ratio of a fifth-order harmonic to the amplitude of a fundamental wave component of induced voltage is changed, in embodiment 1 of the present invention.

In the case where voltage is induced with $\theta_{5e}$ set at 180 degrees and $E_{5P}/E_{1P}$ set at 0 to 15%, the ratio of the fundamental wave peak $E_{1P}$ to the induced voltage peak $E_P$ is as shown in FIG. 7.

From FIG. 7, it is found that when $E_{5P}/E_{1P}$ is set at 2 to 12%, $E_{1P}/E_P$ becomes 1.02 or greater, and when $E_{5P}/E_{1P}$ is set at about 6%, $E_{1P}/E_P$ is maximized.

Figure 8:
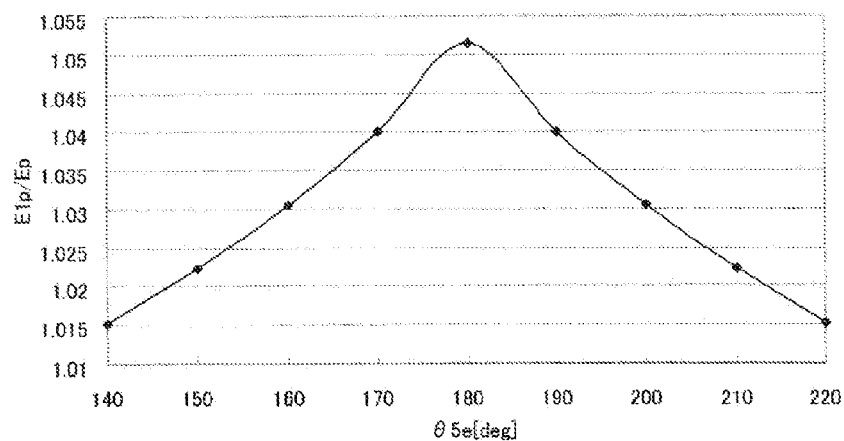
FIG. 8 is a graph showing the ratio of a fundamental wave peak of induced voltage to an induced voltage peak in the case where a phase difference of a fifth-order harmonic component with respect to a fundamental wave component of induced voltage is changed, in embodiment 1 of the present invention.

Next, in the case where $\theta_{5e}$ is set at 140 degrees to 220 degrees, the maximum value of $E_{1P}/E_P$ when $E_{5P}/E_{1L}$ is changed in a range of 0 to 15% is as shown in FIG. 8.

From FIG. 8, it is found that when $\theta_{5e}$ is set at 150 degrees to 210 degrees, $E_{1P}/E_P$ becomes 1.02 or greater, and when $\theta_{5e}$ is set at 180 degrees, $E_{1P}/E_P$ is maximized.

In this consideration, it is assumed that $E_{other}$ which is a sum of other harmonic components is sufficiently smaller than $E_{1P}$ and $E_{5P}$.

Figure 9:
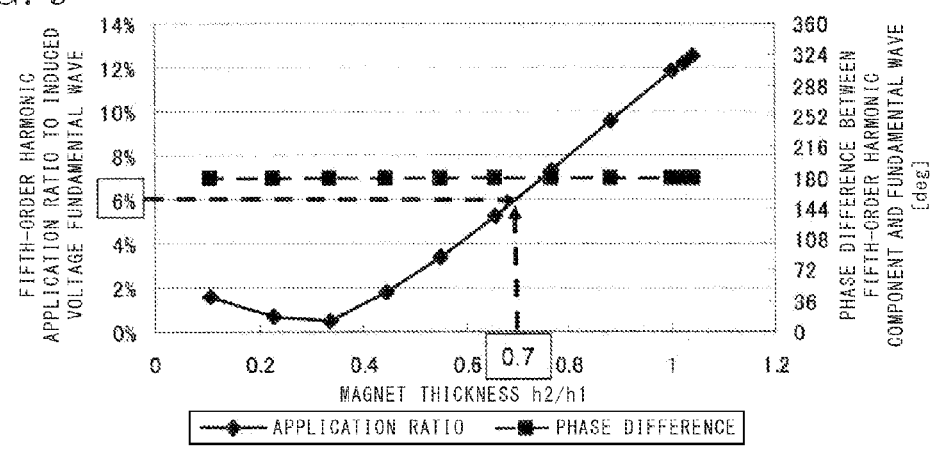
FIG. 9 is a graph showing relationships between a magnet thickness of each field pole, and a phase difference of a fifth-order harmonic component and a fifth-order harmonic application ratio with respect to a fundamental wave component of induced voltage, in the brushless motor according to embodiment 1 of the present invention.

Next, in the present embodiment, the relationships of the phase difference $\theta_{5e}$ and the peak $E_{5P}$ of the fifth-order harmonic component of the induced voltage E with respect to a ratio h2/h1 between a thickness h1 at the center and a thickness h2 at ends of the permanent magnet 314 are as shown in FIG. 9.

Considering the ratio h2/h1 that realizes such values, from FIG. 9, it is found that when h2/h1 is set at about 0.7, $E_{5P}/E_{1P}$ becomes about 6% and $\theta_{5e}$ becomes about 180 degrees, whereby $E_{1P}/E_P$ is maximized.

From the above, in order to improve $E_{1P}/E_P$, it is desirable to set h2/h1 at about 0.7 for the brushless motor 301 shown in FIG. 5.

In the above example, the case where a value represented by a sum of a fundamental wave component, a fifth-order harmonic component, and other-order components as shown by the above expression is applied as the induced voltage E has been described. Hereinafter, the case where the induced voltage E is represented by a sum of a fundamental wave component, a fifth-order harmonic component, a seventh-order harmonic component, and other harmonic components as shown by the following expression will be considered.
[Mathematical 5]

$$E(t)=E_{1P}\sin(\omega t)+E_{3P}\sin(5\omega t+\theta_{5e})+E_{7P}\sin(7\omega t+\theta_{7p})+E_{other} \quad \text{Expression 4}$$

Here, $E_{1P}$, $E_{5P}$, and $E_{7P}$ are peaks of waveforms for the respective orders, $\theta_{5e}$ is a phase difference between the fifth-order harmonic component and the fundamental wave, and $\theta_{7e}$ is a phase difference between the seventh-order harmonic component and the fundamental wave.

Next, change in $E_{1P}/E_P$ when $(E_{5P}+E_{7P})/E_{1P}$, i.e., a sum of an application ratio of the fifth-order harmonic and an application ratio of the seventh-order harmonic with respect to the fundamental wave component of the induced voltage E is changed, will be considered.

Figure 10:
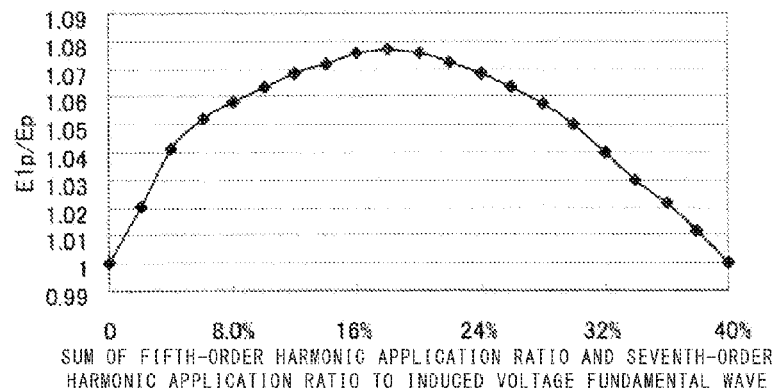
FIG. 10 is a graph showing the ratio of a fundamental wave peak of induced voltage to an induced voltage peak in the case where the ratio of a sum of application ratios of fifth-order and seventh-order harmonics to a fundamental wave component of induced voltage is changed, in embodiment 1 of the present invention.

In the case where $\theta_{5e}$ and $\theta_{7e}$ are set at 180 degrees and $(E_{5P}+E_{7P})/E_{1P}$ is changed in a range of 0 to 40%, the ratio of the fundamental wave peak $E_{1P}$ of the induced voltage E to the induced voltage peak $E_P$ is as shown in FIG. 10.

From FIG. 10, it is found that when $(E_{5P}+E_{7P})/E_{1P}$ is set at 2% to 36%, $E_{1P}/E_P$ becomes 1.02 or greater, and when $(E_{5P}+E_{7P})/E_{1P}$ is set at about 18%, $E_{1P}/E_P$ is maximized.

Figure 11:
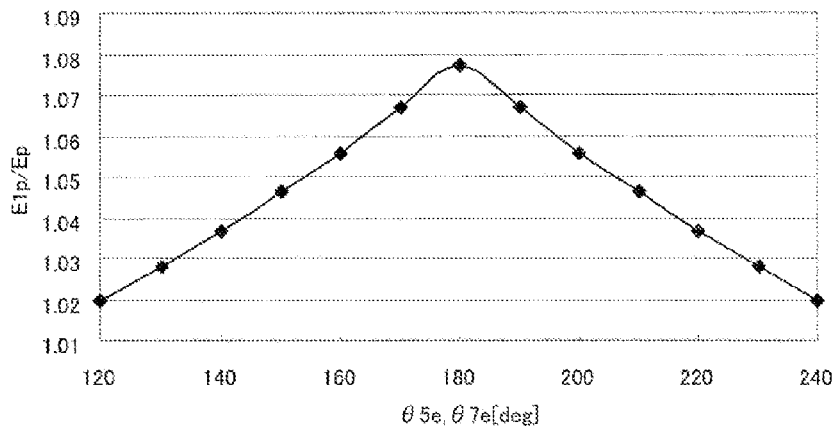
FIG. 11 is a graph showing the ratio of a fundamental wave peak of induced voltage to an induced voltage peak in the case where phase differences of fifth-order and seventh-order harmonic components with respect to a fundamental wave component of induced voltage are changed, in embodiment 1 of the present invention.

Next, in the case where $\theta_{5e}$ is set at 120 degrees to 240 degrees, the maximum value of $E_{1P}/E_P$ when $E_{5P}/E_{1P}$ is changed in a range of 0 to 40% is as shown in FIG. 11.

From FIG. 11, it is found that when $\theta_5$ is set at 120 degrees to 240 degrees, $E_{1P}/E_P$ is 1.02 or greater, and when $\theta_{5e}$ is set at 180 degrees, $E_{1P}/E_P$ is maximized.

In this consideration, it is assumed that the sum $E_{other}$ of other odd-order harmonic components is sufficiently smaller than $E_{1P}$, $E_{5P}$, and $E_{7P}$.

Also in the case of setting h1 and h2 so as to realize such values, the same effect as in the above case can be obtained.

Although not described above, the same effect can be obtained also in the case of applying other odd-order harmonic components to the brushless motor.

Examples of applied orders include third-order, ninth-order, eleventh-order, and thirteenth-order harmonics.

However, in the case where the induced voltage E contains a 3(2k−1)-th order harmonic component (k is an integer equal to or greater than 1), there is a problem that circulating current occurs when three-phase Δ connection is used. Therefore, Y connection is desirable.

Figure 12:
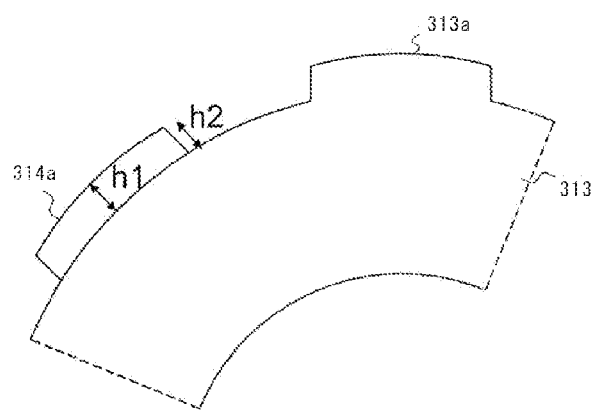
FIG. 12 is a partial enlarged view showing another example of field pole of the brushless motor according to embodiment 1 of the present invention.

In the case where, as shown in FIG. 12, the field pole iron core 313 has a permanent magnet portion 314 as a field pole and a salient pole portion 313a as a field pole having a polarity opposite to that of the former field pole, and such respective field poles are formed at regular intervals in the circumferential direction in the brushless motor 301, the induced voltage E generated between terminals of the brushless motor 301 shown in FIG. 2 by rotation of the magnetic poles is represented by the following expression.

[Mathematical 6]

$$E(t) = E_{tp}\sin(\omega t) + \sum_{k=1}^{\infty} E_{(2k)p}\sin(2k\omega t + \theta_{(2k)e}) + \sum_{k=1}^{\infty} E_{(2k+1)p}\sin((2k+1)\omega t + \theta_{(2k+1)e})$$

Expression 5

In the case where an angle occupied in a field-pole circumferential direction by a pair of N pole and S pole of the field poles is defined as an electric angle of 360 degrees, the coil pitch of the armature windings is 180 degrees, that is, full pitch winding is used. Therefore, an even-order term in the following expression can be made to be approximately zero.

[Mathematical 7]

$$\sum_{k=1}^{\infty} E_{(2k)p}\sin(2k\omega t + \theta_{(2k)e})$$

Expression 6

Therefore, the same consideration as in the above case applies.

In addition, torque ripple and cogging due to the even-order induced voltage E can be reduced.

In the present embodiment, in the case where an angle occupied in a field-pole circumferential direction by a pair of N pole and S pole of the field poles is defined as an electric angle of 360 degrees, the coil pitch of the armature windings is 180 degrees, that is, full pitch winding is used. Therefore, a winding factor of harmonics is improved, and change amounts of application ratios of fifth-order and seventh-order harmonics when h2/h1 is changed can be improved.

However, the same effect as in the above case can be obtained also in the case of using concentrated winding in which wires are wound on teeth in a concentrated manner or in the case of setting the coil pitch at a value other than 180 degrees.

Figure 13:
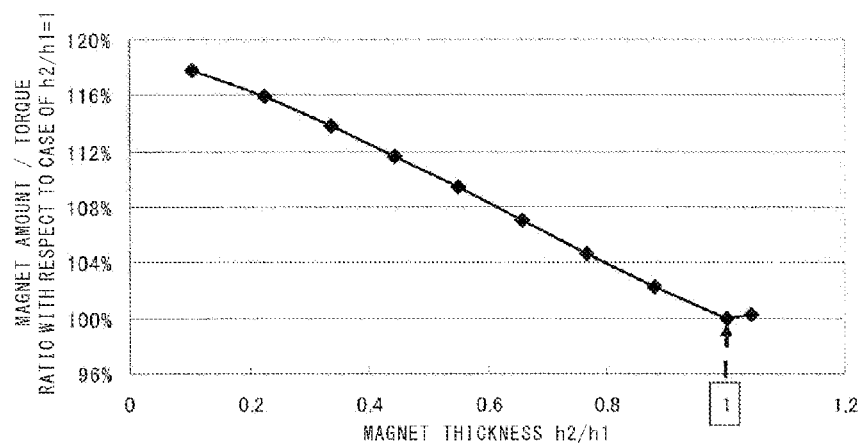
FIG. 13 is a graph showing a relationship between a magnet thickness of each field pole and a magnet amount needed for generating unit torque in embodiment 1 of the present invention.

Next, FIG. 13 shows a magnet amount needed for generating unit torque in the case where h2/h1 is similarly changed.

In FIG. 13, the magnet amount needed for generating unit torque is normalized by a value when h2/h1 is 1.0.

From FIG. 13, it is found that the magnet amount per unit torque is minimized when h2/h1 is set at about 1.0.

The reason is that, if the thickness h1 of the magnet is equal to h2, the armature iron core 310 and the field pole iron core 313 becomes relatively close to each other, and magnetic resistance at a part where the permanent magnet 314 is located reduces, whereby the induced voltage E increases and motor torque is improved.

Therefore, in order to reduce the magnet amount needed for generating unit torque, it is desirable to set h2/h1 at about 1.0.

Figure 14:
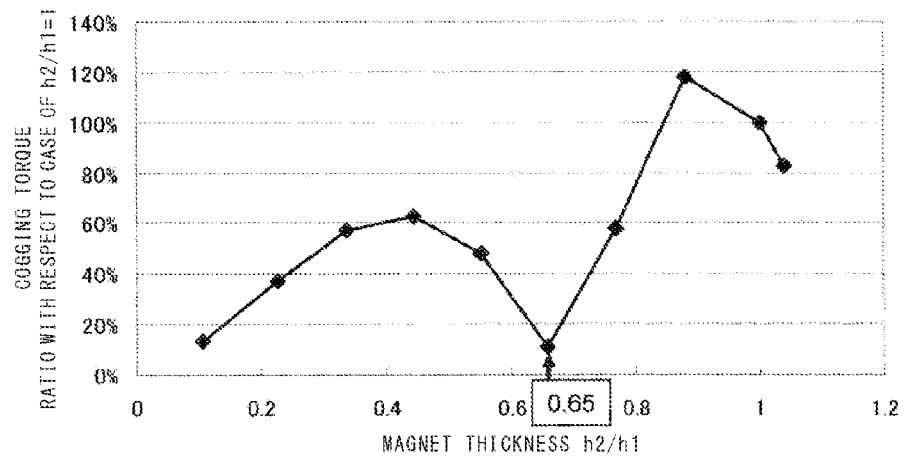
FIG. 14 is a graph showing a magnet thickness ratio in each field pole and the amplitude of cogging torque in embodiment 1 of the present invention.

Next, FIG. 14 shows the amplitude of cogging torque occurring in the brushless motor 301 in the case where h2/h1 is similarly changed.

In FIG. 14, the cogging torque is normalized by a value when h2/h1 is 1.0.

From FIG. 14, it is found that the cogging torque is minimized when h2/h1 is set at about 0.65.

Therefore, in order to reduce the cogging torque occurring in the brushless motor 301, it is desirable to set h2/h1 at about 0.65.

Figure 15:
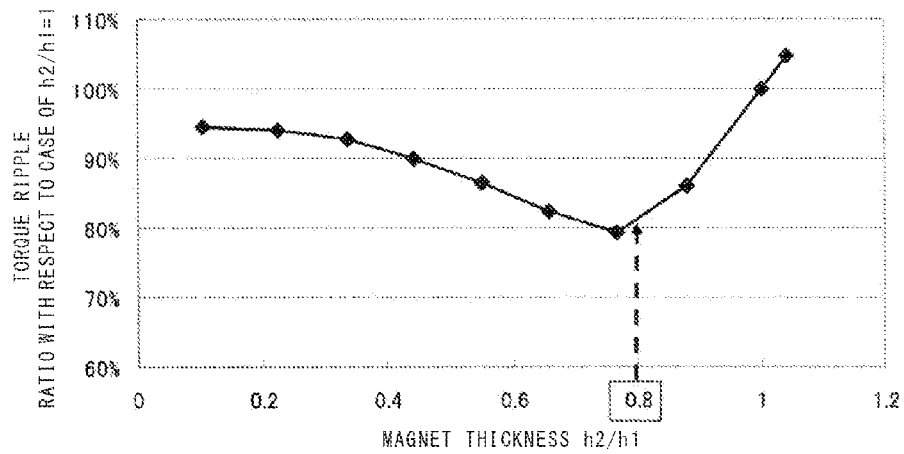
FIG. 15 is a graph showing a magnet thickness ratio in each field pole and the amplitude of a torque ripple component in embodiment 1 of the present invention.

Next, FIG. 15 shows the amplitude of a torque ripple component occurring in the brushless motor 301 in the case where h2/h1 is similarly changed.

In FIG. 15, the torque ripple component is normalized by a value when h2/h1 is 1.0.

In the present embodiment, the two winding sets in the brushless motor which is a multiplex winding motor have a phase difference by 30 degrees with respect to a fundamental wave component, and for the second winding set, current or voltage is applied based on a voltage command having a phase difference by an electric angle of 30 degrees with respect to a fundamental wave component relative to the first winding set.

Therefore, 6(2m−1)-th order torque ripple (m is an integer equal to or greater than 1) due to a {6(2m−1)±1}-th order harmonic component of the induced voltage has a phase difference by 180 degrees between the winding sets, and the torque ripples can be cancelled by each other.

Figure 16:
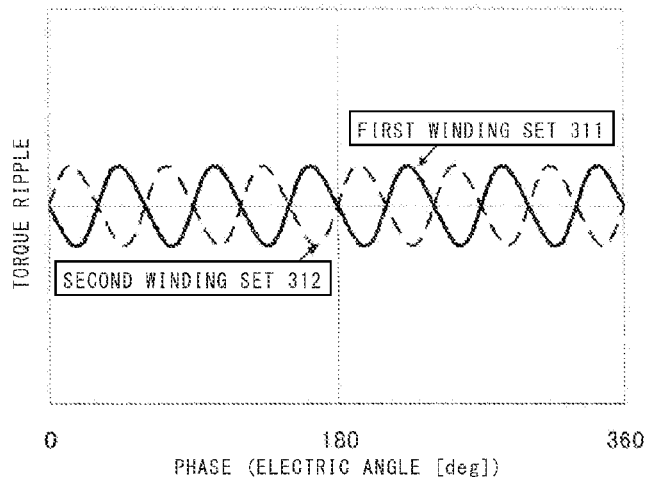
FIG. 16 is an explanation diagram showing that torque ripple is cancelled in the brushless motor according to embodiment 1 of the present invention.

FIG. 16 is an explanation diagram showing that the torque ripples are cancelled in the case where the above driving method is performed.

In FIG. 16, torque ripples for the respective winding sets caused by currents or voltages applied to the first winding set 311 and the second winding set 312 are shown, and it is found that phases of the torque ripples for the first winding set 311 and the second winding set 312 are inverted from each other with a phase difference by about 180 degrees.

From the above, in the present embodiment, since 6(2m−1)-th order torque ripple (m is an integer equal to or greater than 1) is cancelled, it is found that the graph in FIG. 15 shows torque ripple excluding 6(2m−1)-th order torque ripple (m is an integer equal to or greater than 1).

From FIG. 15, it is found that the torque ripple component is minimized when h2/h1 is set at about 0.8.

Therefore, in order to reduce torque ripple components excluding a 6(2m−1)-th order component (m is an integer equal to or greater than 1), which are generated in the brushless motor 301, it is desirable to set h2/h1 at about 0.8.

In the above, the case where h2/h1 of the permanent magnet 314 of a field pole is changed has been described. If the shape is set so that only a {6(2m−1)±1}-th order harmonic component (m is an integer equal to or greater than 1) of induced voltage is contained as the harmonic components of the induced voltage, torque ripple can be made to be approximately zero.

Figure 17:
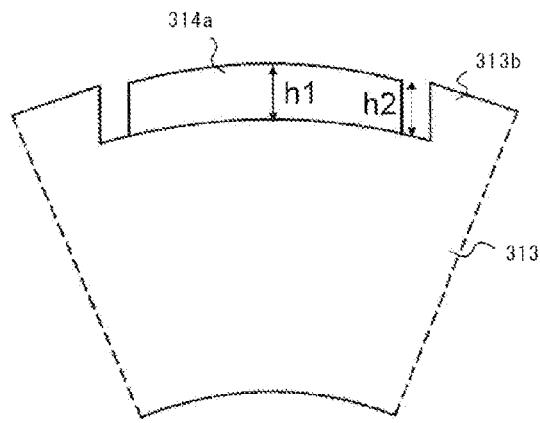
FIG. 17 is a partial enlarged view showing still another example of field pole of the brushless motor according to embodiment 1 of the present invention.

As shown in FIG. 17, a magnet attachment surface may be provided at a surface of the field pole iron core 313, a permanent magnet 314 may be attached on the magnet attachment surface by an adhesive agent, the field pole iron core 313 may have, between the permanent magnets 314, a protrusion 313b which protrudes from the attachment surface for each permanent magnet 314 in a direction from the center of the field pole iron core 313 toward the armature iron core 310, and the thickness at the center of the magnet may be set at h1 and the thickness at ends of the magnet may be set at h2. Also in this case, the same consideration as in the above applies.

However, there is a difference in that, since the field poles have saliency of inductance, reluctance torque occurs.

Figure 18:
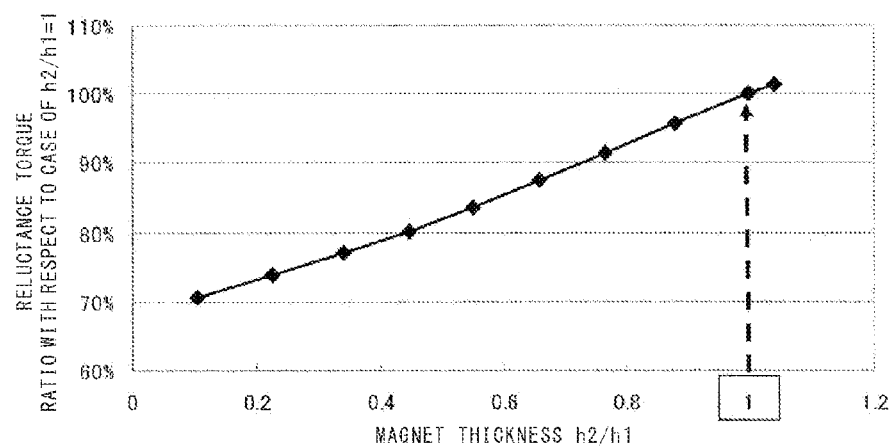
FIG. 18 is a graph showing a relationship between a magnet thickness ratio in each field pole in FIG. 17 and the magnitude of reluctance torque in embodiment 1 of the present invention.

FIG. 18 shows reluctance torque in the case where h2/h1 is changed.

In FIG. 18, the reluctance torque is normalized by a value when h2/h1 is 1.0.

From FIG. 18, it is found that the reluctance torque is maximized when h2/h1 is set at 1.0.

Therefore, in order to improve reluctance torque in the motor shown in FIG. 17, it is desirable to set h2/h1 at 1.0.

Torque of the motor is represented by a sum of magnet torque caused by the permanent magnets and reluctance torque occurring not due to the permanent magnets. Therefore, if the reluctance torque is improved, it becomes possible to reduce the magnet amount needed for generating unit torque.

From the above, in the present embodiment, if h2/h1 of the brushless motor 301 is set appropriately, it is possible to improve motor torque, reduce the magnet amount needed for generating unit torque, reduce cogging torque, or reduce torque ripple, while improving $E_{1P}/E_P$ and suppressing the corresponding induced voltage peak $E_P$.

Regarding the motor shown in FIG. 17, it becomes possible to improve reluctance torque and reduce the magnet amount needed for generating unit torque.

It is noted that, as described above, the value of h2/h1 at which each effect is remarkably exerted differs depending on each effect.

Therefore, in order to improve performance of the brushless motor 301, needless to say, it is desirable and more effective to set the value of h2/h1 so that a plurality of the above effects are obtained.

For example, if h2/h1 is set at 0.65 to 1.0, 0.65 to 0.8, 0.65 to 0.7, 0.7 to 0.1, 0.7 to 0.8, or 0.8 to 1.0, a plurality of the above effects can be obtained at the same time.

In the present embodiment, the case where the multiplex winding motor has two winding sets with a phase difference by 30 degrees has been described. However, as for the relationship therebetween, the phase difference may be a value obtained by dividing 60 degrees by a divisor of the number of the winding sets excluding 1.

For example, in the case of four sets, a phase difference by 15 degrees may be provided for each set, or a phase difference by 30 degrees may be provided on a two-set basis, that is, the phases of the four winding sets may be 0, 0, 30, 30 degrees.

As described above, a multiplex winding motor in which armature windings including a plurality of winding sets each of which includes windings for a plurality of phases are wound on an armature iron core, voltage application means for applying voltages to the plurality of winding sets, and control means for calculating voltage commands for the plurality of winding sets and controlling the voltage application means based on the voltage commands, are provided. The control means controls the voltage application means so that induced voltages generated in the plurality of winding sets by rotation of the multiplex winding motor have a trapezoidal waveform and a phase difference between the voltages for the plurality of winding sets becomes a value that reduces torque ripple caused by the induced voltages. Thus, a novel effect of reducing 6(2m−1)-th order torque ripple (m is an integer equal to or greater than 1) due to a {6(2m−1)±1}-th order harmonic component of the induced voltage can be obtained.

Further, field poles having a plurality of permanent magnets fixed at a surface of a field pole iron core may be provided, and h2/h1 may be set at 0.65 to 1.0, where h1 is the thickness at the center of each permanent magnet and h2 is the thickness at ends of each permanent magnet. In this case, it becomes possible to obtain, in addition to the above effect, a novel effect of improving motor torque, reducing the magnet amount needed for generating unit torque, reducing cogging torque, or reducing torque ripple components having orders other than 6(2m−1)-th order (m is an integer equal to or greater than 1), while improving $E_{1P}/E_P$ and suppressing the induced voltage peak $E_P$.

Further, the field poles may have, between the permanent magnets, protrusions that protrude from the surface at which the permanent magnets are fixed, in a direction from the center of the field pole iron core toward the armature iron core. In this case, a novel effect of improving reluctance torque and thereby reducing the magnet amount needed for generating unit torque can be obtained in addition to the above effect.

Further, the field poles may have permanent magnet portions as first field poles and salient pole portions as second field poles having a polarity opposite to that of the first field poles, the first field poles and the second field poles may be respectively placed at regular intervals in the circumferential direction of the field pole iron core, and in the case where an angle occupied in the circumferential direction of the field pole iron core by a pair of N pole and S pole of the field poles is defined as an electric angle of 360 degrees, the coil pitch of the windings may be set at 180 degrees. In this case, a novel effect can be obtained in which even-order induced voltage can be reduced, and while $E_{1P}/E_P$ is improved and the corresponding induced voltage peak $E_P$ is suppressed, motor torque is improved or cogging or ripple due to the even-order induced voltage is reduced.

Further, induced voltage generated in the armature windings between the terminals of the motor by rotation of the field poles of the multiplex winding motor may be set to have a waveform in which at least one of a fifth-order harmonic component and a seventh-order harmonic component is superimposed on a fundamental wave component of the induced voltage so as to satisfy a predetermined phase difference condition and a predetermined amplitude condition that allow a fundamental wave peak of the induced voltage to be higher than the induced voltage peak $E_P$. In this case, in the multiplex winding motor, 6(2m−1)-th order torque ripple (m is an integer equal to or greater than 1) due to a {6(2m−1)±1}-th order harmonic component of the induced voltage is cancelled. Therefore, a novel effect can be obtained in which torque ripple due to fifth-order and seventh-order components in the induced voltage becomes approximately zero, and while $E_{1P}/E_P$ is improved and the corresponding induced voltage peak $E_P$ is suppressed, motor torque is improved.

Further, in the case where one cycle of a harmonic component is 360 degrees, a fifth-order harmonic component of the induced voltage may be set to have a phase difference by 150 degrees to 210 degrees with respect to a fundamental wave component of the induced voltage, and the ratio of an amplitude of the fifth-order harmonic component to an amplitude of the fundamental wave component of the induced voltage may be set at 2 to 12%. In this case, a novel effect of improving motor torque while further improving $E_{1P}/E_P$ as compared to the above cases and suppressing the corresponding induced voltage peak $E_P$, can be obtained.

Further, in the case where one cycle of a harmonic component is 360 degrees, a fifth-order harmonic component and a seventh-order harmonic component of the induced voltage may be set to have a phase difference by 120 degrees to 240 degrees with respect to a fundamental wave component of the induced voltage, and the ratio of a sum of an amplitude of the fifth-order harmonic component and an amplitude of the seventh-order harmonic component to an amplitude of the fundamental wave component of the induced voltage may be set at 2 to 36%. In this case, a novel effect of improving motor torque while further improving $E_{1P}/E_P$ as compared to the above cases and suppressing the corresponding induced voltage peak $E_P$, can be obtained.

Embodiment 2

Figure 19:
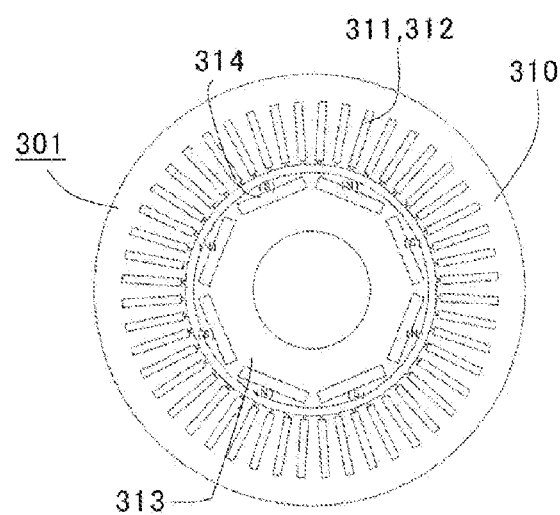
FIG. 19 is a sectional view showing an example of a brushless motor according to embodiment 2 of the present invention.

FIG. 19 shows a sectional view of a brushless motor of a motor drive device according to embodiment 2.

Figure 20:
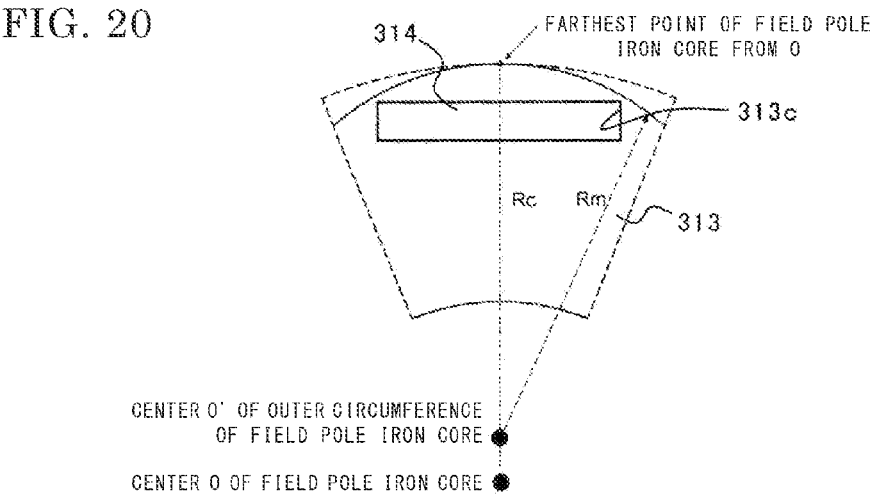
FIG. 20 is a partial enlarged view showing the configuration of one pole of field poles of the brushless motor according to embodiment 2 of the present invention.

FIG. 20 shows an enlarged view of one pole of the field poles.

A magnet hole 313c into which the permanent magnet 314 is inserted is provided inside the field pole iron core 313. A plurality of the permanent magnets 314 are inserted and fixed in the magnet holes, thus forming the field poles. In the brushless motor 301, in the case where the distance from the center of the field pole iron core 313 to the farthest point of the field pole iron core 313 is Rc, the outer circumference of the field pole iron core 313 has, in a most region thereof, approximately an arc shape with a radius Rm.

The other configuration is the same as in embodiment 1.

In the brushless motor having such a structure, induced voltage generated between the terminals of the motor by rotation of the field poles is, if the field poles have a symmetric structure for each magnetic pole, represented by expression 1.

Figure 21:
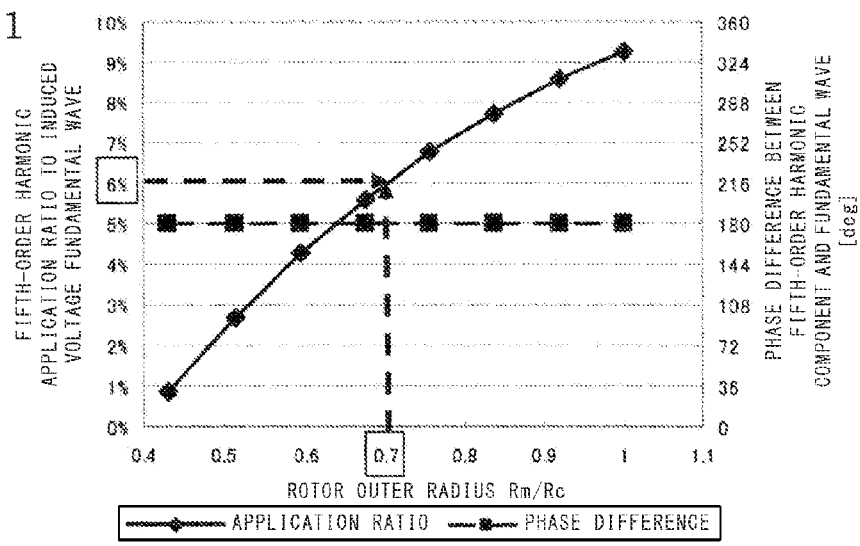
FIG. 21 is a graph showing relationships between an outer radius ratio in each field pole, and a phase difference of a fifth-order harmonic component and a fifth-order harmonic application ratio with respect to a fundamental wave component of induced voltage, in embodiment 2 of the present invention.

Here, in the present embodiment, the relationships between a rotor outer radius Rm/Rc which is an outer radius ratio of the field poles, and a phase difference of a fifth-order harmonic component and an application ratio of the fifth-order harmonic component with respect to a fundamental wave component of the induced voltage, are as shown in FIG. 21.

Here, as in embodiment 1, considering the ratio Rm/Rc that improves $E_{1P}/E_P$, from FIG. 21, it is found that, when Rm/Rc is set at about 0.7, $E_{5P}/E_{1P}$ becomes 6% and $\theta_{5e}$ becomes about 180 degrees, whereby $E_{1P}/E_P$ is almost maximized.

From the above, in the brushless motor shown in FIG. 20, it is found that $E_{1P}/E_P$ can be improved when Rm/Rc is set at about 0.7.

In the above example, the case where a value represented by a sum of a fundamental wave component, a fifth-order harmonic component, and other-order components as described above is applied as the induced voltage has been described. However, also in the case where the induced voltage is represented by a sum of a fundamental wave component, a fifth-order harmonic component, a seventh-order harmonic component, and other-order components as shown in expression 4, the same consideration as described in embodiment 1 applies if Rm/Rc is set appropriately.

Although not described above, the same effect can be obtained also in the case of applying other odd-order harmonic components to the brushless motor.

Examples of applied orders include third-order, ninth-order, eleventh-order, and thirteenth-order harmonics.

However, in the case where the induced voltage contains a 3(2k–1)-th order harmonic component (k is an integer equal to or greater than 1), there is a problem that circulating current occurs when three-phase Δ connection is used. Therefore, Y connection is desirable.

Figure 22:
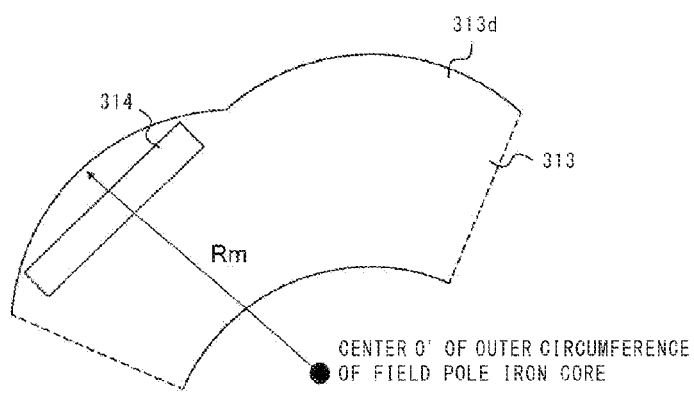
FIG. 22 is a partial enlarged view showing another example of field pole of the brushless motor according to embodiment 2 of the present invention.

In the case where, as shown in FIG. 22, the field pole iron core 313 has a permanent magnet portion 314 as a field pole and a salient pole portion 313d as a field pole having a polarity opposite to that of the former field pole, and such respective field poles are formed at regular intervals in the circumferential direction in the brushless motor, the induced voltage E generated between terminals of the motor by rotation of the magnetic poles is represented by expression 5. Therefore, in the case where an angle occupied in a field-pole circumferential direction by a pair of N pole and S pole of the field poles is defined as an electric angle of 360 degrees, if the coil pitch of the armature windings is set at 180 degrees, that is, full pitch winding is used, the even-order term shown in expression 6 can be made to be zero.

Therefore, the same consideration as in the above case applies.

In the present embodiment, in the case where an angle occupied in a field-pole circumferential direction by a pair of N pole and S pole of the field poles is defined as an electric angle of 360 degrees, the coil pitch of the windings is 180 degrees, that is, full pitch winding is used. Therefore, a winding factor of harmonics is improved, and change amounts of application ratios of fifth-order and seventh-order harmonics of the induced voltage when Rm/Rc is changed can be improved.

However, the same effect as in the above case can be obtained also in the case of using concentrated winding in which wires are wound on teeth in a concentrated manner or in the case of setting the coil pitch at a value other than 180 degrees.

Figure 23:
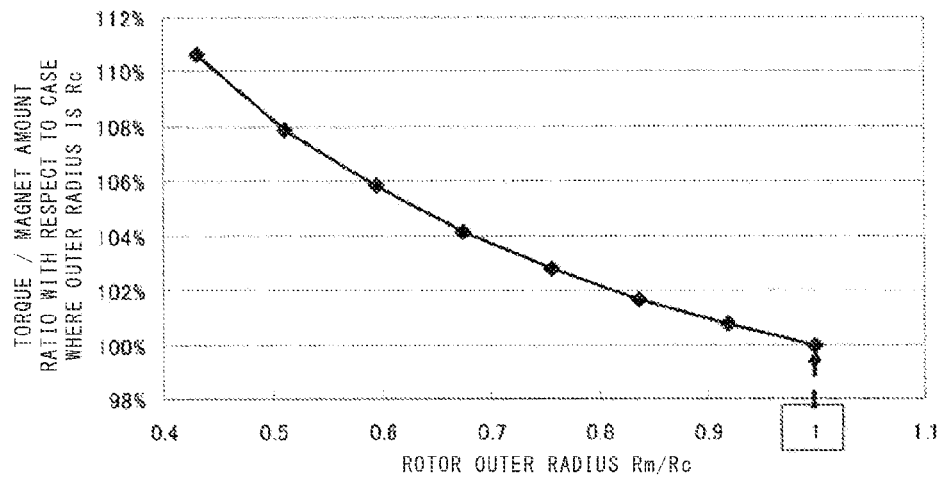
FIG. 23 is a graph showing a relationship between an outer radius ratio in each field pole and a magnet amount needed for generating unit torque in embodiment 2 of the present invention.

Next, FIG. 23 shows a value indicating a magnet amount needed for generating unit torque, in the case where Rm/Rc is similarly changed.

In FIG. 23, the magnet amount needed for generating unit torque is normalized by a value when Rm/Rc is 1.0.

From FIG. 23, it is found that the magnet amount per unit torque is minimized when Rm/Rc is set at 1.0.

The reason is that, if the radius Rm is equal to Rc, the armature iron core 310 and the field pole iron core 313 becomes relatively close to each other, and magnetic resistance in the air gap reduces, whereby the induced voltage E increases and motor torque is improved.

Therefore, in order to reduce the magnet amount needed for generating unit torque, it is desirable to set Rm/Rc at about 1.0.

Figure 24:
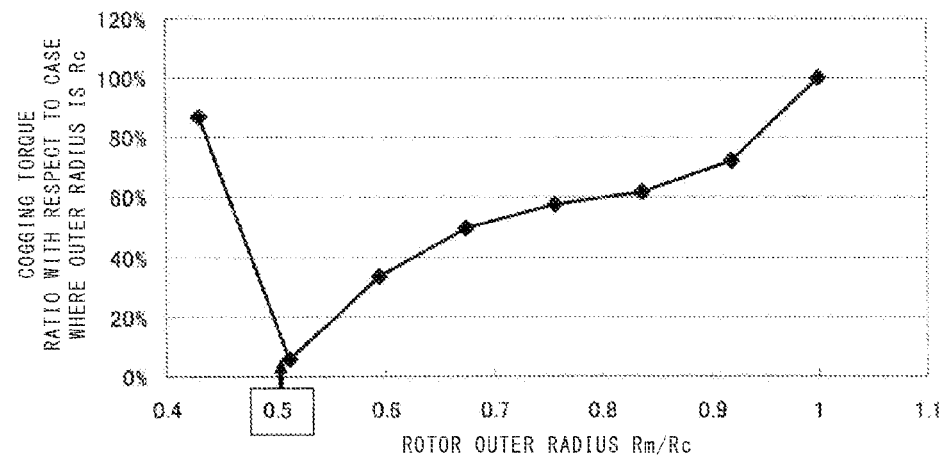
FIG. 24 is a graph showing a relationship between an outer radius ratio in each field pole and the amplitude of cogging torque in embodiment 2 of the present invention.

Next, FIG. 24 shows the amplitude of cogging torque occurring in the brushless motor, in the case where Rm/Rc is similarly changed.

In FIG. 24, the cogging is normalized by a value when Rm/Rc is 1.0.

From FIG. 24, it is found that the cogging torque is almost minimized when Rm/Rc is set at 0.5.

Therefore, in order to reduce the cogging torque occurring in the brushless motor, it is desirable to set Rm/Rc at 0.5.

Figure 25:
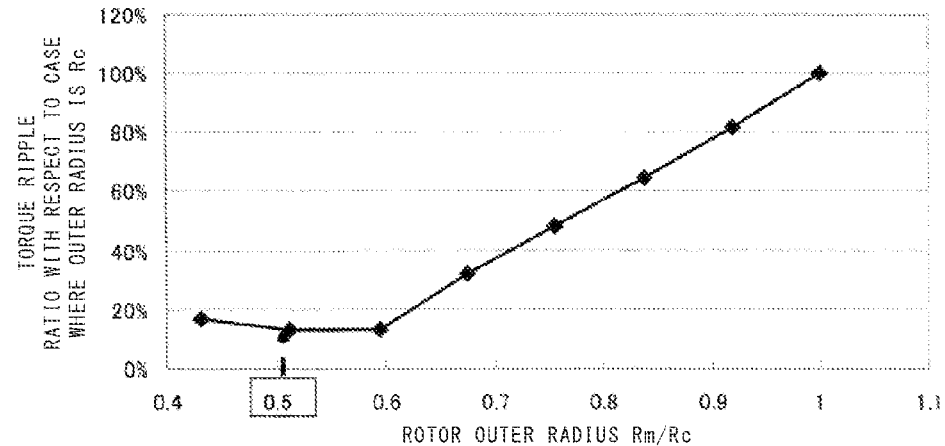
FIG. 25 is a graph showing a relationship between an outer radius ratio in each field pole and the amplitude of a torque ripple component in embodiment 2 of the present invention.

Next, FIG. 25 shows the amplitude of a torque ripple component occurring in the brushless motor, in the case where Rm/Rc is similarly changed.

In FIG. 25, the torque ripple component is normalized by a value when Rm/Rc is 1.0.

In the present embodiment, the two winding sets in the multiplex winding motor have a phase difference by 30 degrees with respect to a fundamental wave component, and for the second winding set, current or voltage is applied based on a voltage command having a phase difference by an electric angle of 30 degrees with respect to a fundamental wave component relative to the first winding set.

Therefore, 6(2m−1)-th order torque ripple (m is an integer equal to or greater than 1) due to a {6(2m−1)±1}-th order harmonic component of the induced voltage has a phase difference by 180 degrees between the winding sets, and the torque ripples can be cancelled by each other.

FIG. 16 is an explanation diagram showing that the torque ripples are cancelled.

In FIG. 16, torque ripples for the respective winding sets caused by currents or voltages applied to the first winding set and the second winding set are shown, and it is found that phases of the torque ripples for the first winding set and the second winding set are inverted from each other with a phase difference by about 180 degrees.

From the above, in the present embodiment, since 6(2m−1)-th order torque ripple (m is an integer equal to or greater than 1) is cancelled, it is found that the graph in FIG. 25 shows torque ripple excluding 6(2m−1)-th order torque ripple (m is an integer equal to or greater than 1).

From FIG. 25, it is found that the torque ripple component is minimized when Rm/Rc is set at 0.5.

Therefore, in order to reduce torque ripple components excluding a 6(2m−1)-th order component (m is an integer equal to or greater than 1), which are generated in the brushless motor, it is desirable to set Rm/Rc at about 0.5.

In the above, the case where Rm/Rc of the field pole iron core is changed has been described. If the shape is set so that only a {6(2m−1)±1}-th order harmonic component (m is an integer equal to or greater than 1) of induced voltage is contained as the harmonic components of the induced voltage, torque ripple can be made to be approximately zero.

Figure 26:
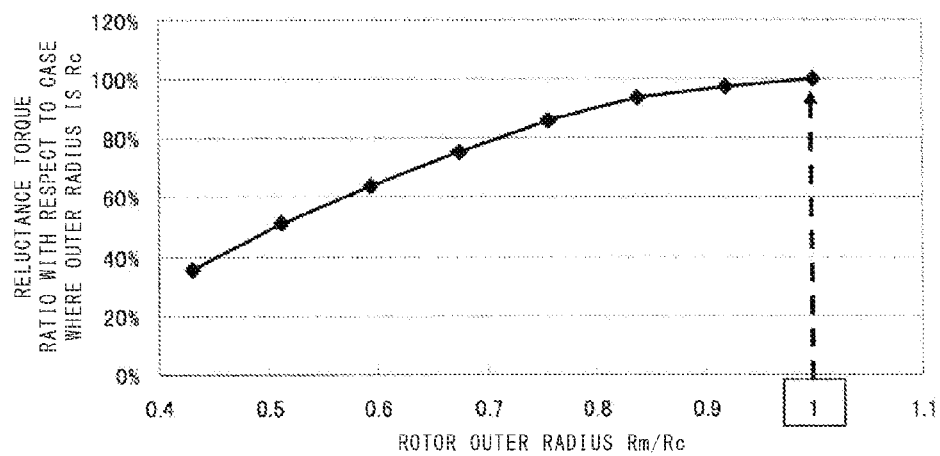
FIG. 26 is a graph showing a relationship between an outer radius ratio in each field pole and the magnitude of reluctance torque in embodiment 2 of the present invention.

Next, FIG. 26 shows reluctance torque generated in the brushless motor, in the case where Rm/Rc is similarly changed.

In FIG. 26, the reluctance torque is normalized by a value when Rm/Rc is 1.0.

From FIG. 26, it is found that the reluctance torque is almost maximized when Rm/Rc is set at 1.0.

Therefore, in order to improve reluctance torque, it is desirable to set Rm/Rc at 1.0.

Torque of the motor is represented by a sum of magnet torque caused by the permanent magnets and reluctance torque occurring not due to the permanent magnets. Therefore, if the reluctance torque is improved, it becomes possible to reduce the magnet amount needed for generating unit torque.

Figure 27:
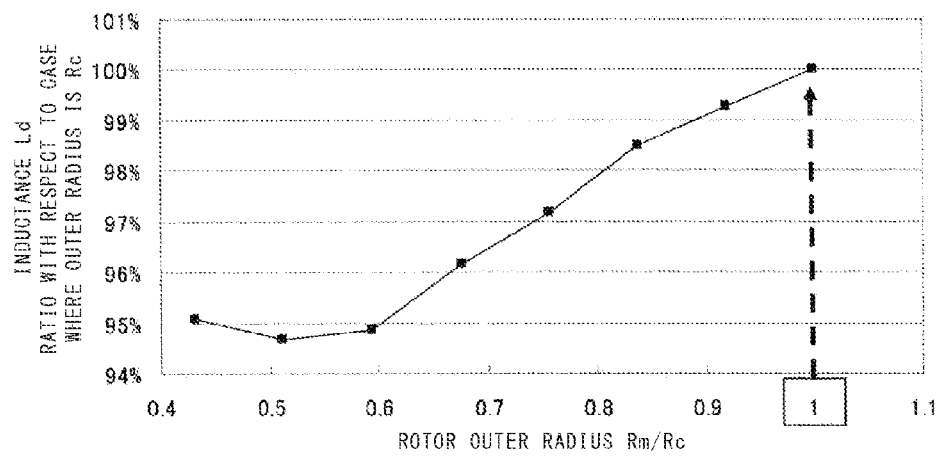
FIG. 27 is a graph showing a relationship between an outer radius ratio in each field pole and the magnitude of a d-axis component of inductance in embodiment 2 of the present invention.

Next, FIG. 27 shows inductance Ld in a d-axis direction of the brushless motor, in the case where Rm/Rc is similarly changed.

In FIG. 27, the inductance Ld is normalized by a value when Rm/Rc is 1.0.

From FIG. 27, it is found that a d-axis component of inductance is maximized when Rm/Rc is set at 1.0.

Generally, if a d-axis component of inductance is improved, an effect of cancelling induced voltage E generated between the terminals of the motor by rotation of the field poles when d-axis current is applied can be increased, torque in a high rotation region can be improved by increasing current that flows in the motor and contributes to the torque, and the maximum rotation rate when the motor is driven with no load and output at a high rotation rate are improved.

Therefore, in order to improve the maximum rotation rate when the brushless motor is driven with no load, and output at a high rotation rate, it is desirable that the inductance is great.

Therefore, in order to improve the inductance Ld, it is desirable to set Rm/Rc at 1.0.

From the above, in the present embodiment, if Rm/Rc of the brushless motor is set appropriately, it is possible to improve motor torque, reduce the magnet amount needed for generating unit torque, reduce cogging torque, reduce torque ripple, improve reluctance torque, or improve the maximum rotation rate when the motor is driven with no load, and output at a high rotation rate, while improving $E_{1P}/E_P$ and suppressing the corresponding induced voltage peak $E_P$.

It is noted that, as described above, the value of Rm/Rc at which each effect is remarkably exerted differs depending on each effect.

Therefore, in order to improve performance of the brushless motor, needless to say, it is desirable and more effective to set the value of Rm/Rc so that a plurality of the above effects are obtained.

For example, if Rm/Rc is set at 0.5 to 1.0, 0.5 to 0.7, or 0.7 to 1.0, a plurality of the above effects can be obtained at the same time.

In the present embodiment, the case where the multiplex winding motor has two winding sets with a phase difference by 30 degrees has been described. However, as for the relationship therebetween, the phase difference may be a value obtained by dividing 60 degrees by a divisor of the number of the winding sets excluding 1.

For example, in the case of four sets, a phase difference by 15 degrees may be provided for each set, or a phase difference by 30 degrees may be provided on a two-set basis, that is, the phases of the four winding sets may be 0, 0, 30, 30 degrees.

As described above, a multiplex winding motor in which armature windings including a plurality of winding sets each of which includes windings for a plurality of phases are wound on an armature iron core, voltage application means for applying voltages to the plurality of winding sets, and control means for calculating voltage commands for the plurality of winding sets and controlling the voltage application means based on the voltage commands, are provided. The control means controls the voltage application means so that induced voltages generated in the plurality of winding sets by rotation of the multiplex winding motor have a trapezoidal waveform and a phase difference between the voltages for the plurality of winding sets becomes a value that reduces torque ripple caused by the induced voltages. Thus, a novel effect of reducing 6(2m−1)-th order torque ripple (m is an integer equal to or greater than 1) due to a {6(2m−1)±1}-th order harmonic component of the induced voltage can be obtained.

Further, a magnet hole in which each permanent magnet is inserted may be provided inside a field pole iron core, field poles having a plurality of permanent magnets inserted and fixed in the magnet holes may be provided, and in the case where the distance from the center of the field pole iron core to the farthest point of the field pole iron core is Rc, the outer circumference of the field pole iron core may have, in a most region thereof, approximately an arc shape with a radius Rm, and Rm/Rc may be set at 0.5 to 1.0. In this case, a novel effect can be obtained in which, while $E_{1P}/E_P$ is improved and the induced voltage peak $E_P$ is suppressed, motor torque is improved, the magnet amount needed for generating unit torque is reduced, cogging torque is reduced, torque ripple having orders other than 6(2m−1)-th order (m is an integer equal to or greater than 1) is reduced, reluctance torque is improved so that the magnet amount needed for generating unit torque is reduced, or inductance is improved so that the maximum rotation rate when the motor is driven with no load and output at a high rotation rate are improved.

Further, the field poles may have permanent magnet portions as first field poles and salient pole portions as second field poles having a polarity opposite to that of the first field poles, the first field poles and the second field poles may be respectively placed at regular intervals in the circumferential direction of the field pole iron core, and in the case where an angle occupied in the circumferential direction of the field pole iron core by a pair of N pole and S pole of the field poles is defined as an electric angle of 360 degrees, the coil pitch of the windings may be set at 180 degrees. In this case, a novel effect can be obtained in which even-order induced voltage can be reduced, and while $E_{1P}/E_P$ is improved and the corresponding induced voltage peak $E_P$ is suppressed, motor torque is improved or cogging or ripple due to the even-order induced voltage is reduced.

Further, induced voltage generated in the armature windings between the terminals of the motor by rotation of the field poles of the multiplex winding motor may be set to have a waveform in which at least one of a fifth-order harmonic component and a seventh-order harmonic component is superimposed on a fundamental wave component of the induced voltage so as to satisfy a predetermined phase difference condition and a predetermined amplitude condition that allow a fundamental wave peak of the induced voltage to be higher than the induced voltage peak $E_P$. In this case, in the multiplex winding motor, 6(2m−1)-th order torque ripple (m is an integer equal to or greater than 1) due to a {6(2m−1)±1}-th order harmonic component of the induced voltage is cancelled. Therefore, a novel effect can be obtained in which torque ripple due to fifth-order and seventh-order components in the induced voltage becomes approximately zero, and while $E_{1P}/E_P$ is improved and the corresponding induced voltage peak $E_P$ is suppressed, motor torque is improved.

Further, in the case where one cycle of a harmonic component is 360 degrees, a fifth-order harmonic component of the induced voltage may be set to have a phase difference by 150 degrees to 210 degrees with respect to a fundamental wave component of the induced voltage, and the ratio of an amplitude of the fifth-order harmonic component to an amplitude of the fundamental wave component of the induced voltage may be set at 2 to 12%. In this case, a novel effect of improving motor torque while further improving $E_{1P}/E_P$ as compared to the above cases and suppressing the corresponding induced voltage peak $E_P$, can be obtained.

Further, in the case where one cycle of a harmonic component is 360 degrees, a fifth-order harmonic component and a seventh-order harmonic component of the induced voltage may be set to have a phase difference by 120 degrees to 240 degrees with respect to a fundamental wave of the voltage, and the ratio of a sum of an amplitude of the fifth-order harmonic component and an amplitude of the seventh-order harmonic component to an amplitude of the fundamental wave component of the induced voltage may be set at 2 to 36%. In this case, a novel effect of improving motor torque while further improving $E_{1P}/E_P$ as compared to the above cases and suppressing the corresponding induced voltage peak $E_P$, can be obtained.

Embodiment 3

Figure 28:
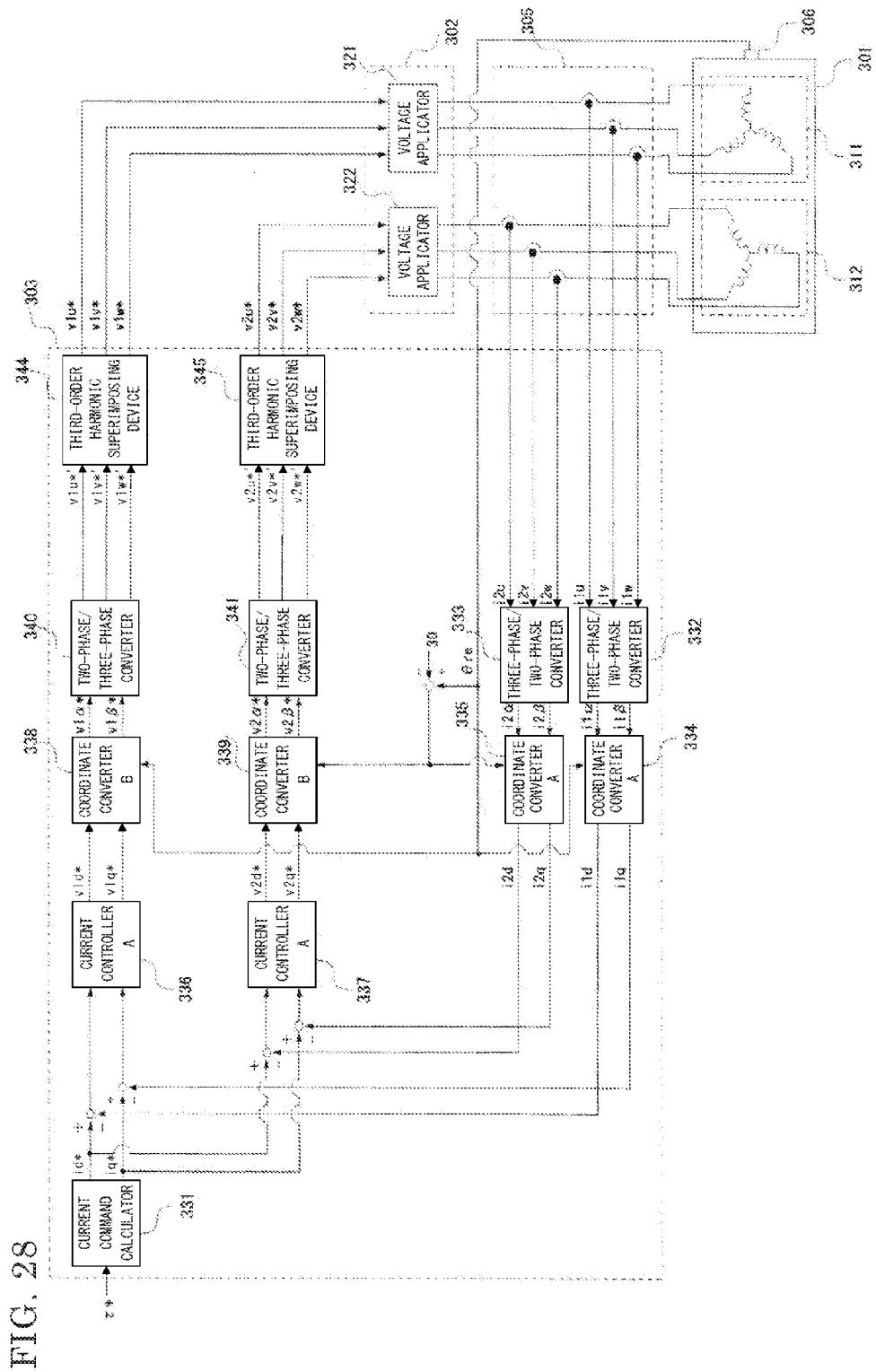
FIG. 28 is a block configuration diagram showing a motor drive device according to embodiment 3 of the present invention.

FIG. 28 shows the configuration of embodiment 3 of the present invention.

The brushless motor 301 which is a multiplex winding motor has two sets of three-phase windings on a stator, and the second winding set 312 has a phase difference by 30 degrees relative to the first winding set 311.

For example, a motor in which induced voltage contains a harmonic component as described in embodiment 1 or 2 is used.

The voltage application means 302 is connected to the brushless motor 301.

The control means 303 outputs a voltage command to the voltage application means 302.

The voltage application means 302 is composed of the voltage applicators 321 and 322 corresponding to the respective winding sets, and supplies voltage to the brushless motor 301, by a power supply such as an inverter, based on voltage commands v1u*, v1v*, v1w*, v2u*, v2v*, v2w*, v3u*, v3v*, v3w*, v4u*, v4v*, and v4w* outputted from the control means 303.

The maximum value of the line-to-line voltage amplitude is limited to Vllmax.

Hereinafter, a control part for the first winding set 311, the voltage applicator 321 connected thereto, and a route from the first winding set 311 via current detection to the voltage applicator 321 in the control means 303, is referred to as a first system, and similarly, a part relevant to the second winding set 312 and the voltage applicator 322 is referred to as a second system.

The control means 303 in FIG. 24 will be described.

A current command calculator 331 calculates a D-axis current command id* and a Q-axis current command iq* in a rotational coordinate system synchronized with a magnetic pole position θre detected by a magnetic pole position detector 306, based on desired torque τ* of the brushless motor 301.

For the first winding set 311, a three-phase/two-phase converter 332 converts motor currents i1u, i1v, and i1w to current values i1α and i1β in a two-axis coordinate system at rest.

For the second winding set 312, a three-phase/two-phase converter 333 performs similar processing.

Here, values α and β in the two-axis coordinate system at rest are obtained by converting values U, V, and W in the three-phase coordinate system by the following expression.

[Mathematical 8]

$$\begin{bmatrix} \alpha \\ \beta \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} U \\ V \\ W \end{bmatrix} \quad \text{Expression 7}$$

For the first winding set 311, a coordinate converter A334 converts the current values i1α and i1β in the two-axis coordinate system at rest to current values i1d and i1q in a rotational coordinate system.

For the second winding set 312, a coordinate converter A335 performs similar processing.

Here, values D and Q in the rotational coordinate system are obtained by converting values α and β in the two-axis coordinate system at rest by the following expression using the magnetic pole position θre.

[Mathematical 9]

$$\begin{bmatrix} D \\ Q \end{bmatrix} = \begin{bmatrix} \cos\theta_{re} & \sin\theta_{re} \\ -\sin\theta_{re} & \cos\theta_{re} \end{bmatrix} \begin{bmatrix} \alpha \\ \beta \end{bmatrix} \quad \text{Expression 8}$$

For the first winding set 311, a current controller A336 performs, for example, proportional integral control for a difference between the D-axis current command id* and i1d and a difference between the Q-axis current command iq* and i1q, to calculate a D-axis voltage command v1d* for the first winding set and a Q-axis voltage command v1q* for the first winding set.

For the second winding set 312, a current controller A337 performs similar processing.

For the first winding set 311, a coordinate converter B338 converts the D-axis voltage command v1d* and the Q-axis voltage command v1q* in the rotational coordinate system to voltage commands v1α* and v1β* on two axes at rest.

For the second winding set 312, a coordinate converter B339 performs similar processing.

For the first winding set, a two-phase/three-phase converter 340 converts the voltage commands v1α* and v1β* on two axes at rest to three-phase voltage commands v1u*''', v1v*''', and v1w*'''.

For the second winding set, a two-phase/three-phase converter 341 performs similar processing.

Here, according to the phase difference by 30 degrees of the motor windings, (θre−30) degrees are substituted into the motor magnetic pole position θre used for the coordinate converter A335 and the two-phase/three-phase converter 341, thus giving the phase difference.

A third-order harmonic superimposing device 344 superimposes a third-order harmonic on the outputs V1u*', V1v*', and V1w*' of the two-phase/three-phase converter 340, and outputs the resultant values V1u*, V1v*, and V1w*.

A method for superimposing a third-order harmonic on the voltage commands (V1u*', V1v*', V1w*') is known (for example, Matsumoto et al. "Actual theory and design of AC servo", General electronic publishing, chapter 3, pp. 44-47). Such a known method may be used for the third-order harmonic superimposing device 344.

As in the third-order harmonic superimposing device 344, a third-order harmonic superimposing device 345 superimposes a third-order harmonic on the outputs V2u*', V2v*', and V2w*' of the two-phase/three-phase converter 341, and outputs the resultant values V2u*, V2v*, and V2w*.

The current controllers A336 and A337 perform control typified by proportional integral control as described above. A band of control response in this control loop, that is, a frequency band in which an actual current value can follow based on a current command is determined depending on a current control gain by which a difference between a current command and a current value is multiplied in the proportional integral control.

The band of control response in the control loop is required to be set so as to sufficiently suppress torque ripple occurring in synchronization with rotation of the motor.

In a normal motor, torque ripple whose rotation order is a sixth order (which may be referred to as 6f) is particularly great, and it is necessary to heighten a band of control response so as to sufficiently suppress this torque ripple.

In such a normal motor, for example, in the case of supporting a rotation rate of up to 3000 rpm, if the motor has four pole pairs, the frequency of the 6f torque ripple is 3000/60×4×6=1200 Hz.

In order to sufficiently suppress torque ripple and enable response of an actual current value and actual torque to follow based on a current command, it is desirable to set the band of control response at 1200 Hz or higher.

However, in the present configuration, although induced voltage of the motor has a torque ripple factor that is a 6f component, since the motor has duplex windings having a phase difference by 30 degrees, the 6f component is cancelled between the first system corresponding to the first winding set 311 and the second system corresponding to the second winding set 312.

Therefore, it is not necessary to heighten the band of current control to 1200 Hz or higher, but the band may be set to be lower than 1200 Hz.

Thus, since the frequency band of control response can be lowered as compared to normal design, the calculation speeds of the current controllers can be decreased, whereby the cost of a CPU can be reduced.

On the other hand, in order to accurately realize a fundamental wave component (1f) of current in a range up to 3000 rpm, the band is set at 200 Hz or higher because the frequency of the fundamental wave is 3000/60×4×1=200 Hz.

Therefore, if the band of control response in the control loop is set in a range from 200 Hz to 1200 Hz, the fundamental wave can be accurately realized, torque required by a torque command can be accurately obtained, torque ripple can be suppressed, and a calculation speed can be decreased, whereby the cost of a CPU can be reduced.

The motor drive device of the present embodiment can be applied to a steering of a vehicle to configure an electric power steering device, thereby providing effects of improving output by induced voltage having a trapezoidal waveform, thereby reducing load on a driver, suppressing torque ripple by a phase difference between systems, thereby reducing strangeness that a driver feels, and decreasing a calculation speed, thereby reducing the cost of a CPU.

Embodiment 4

Figure 29:
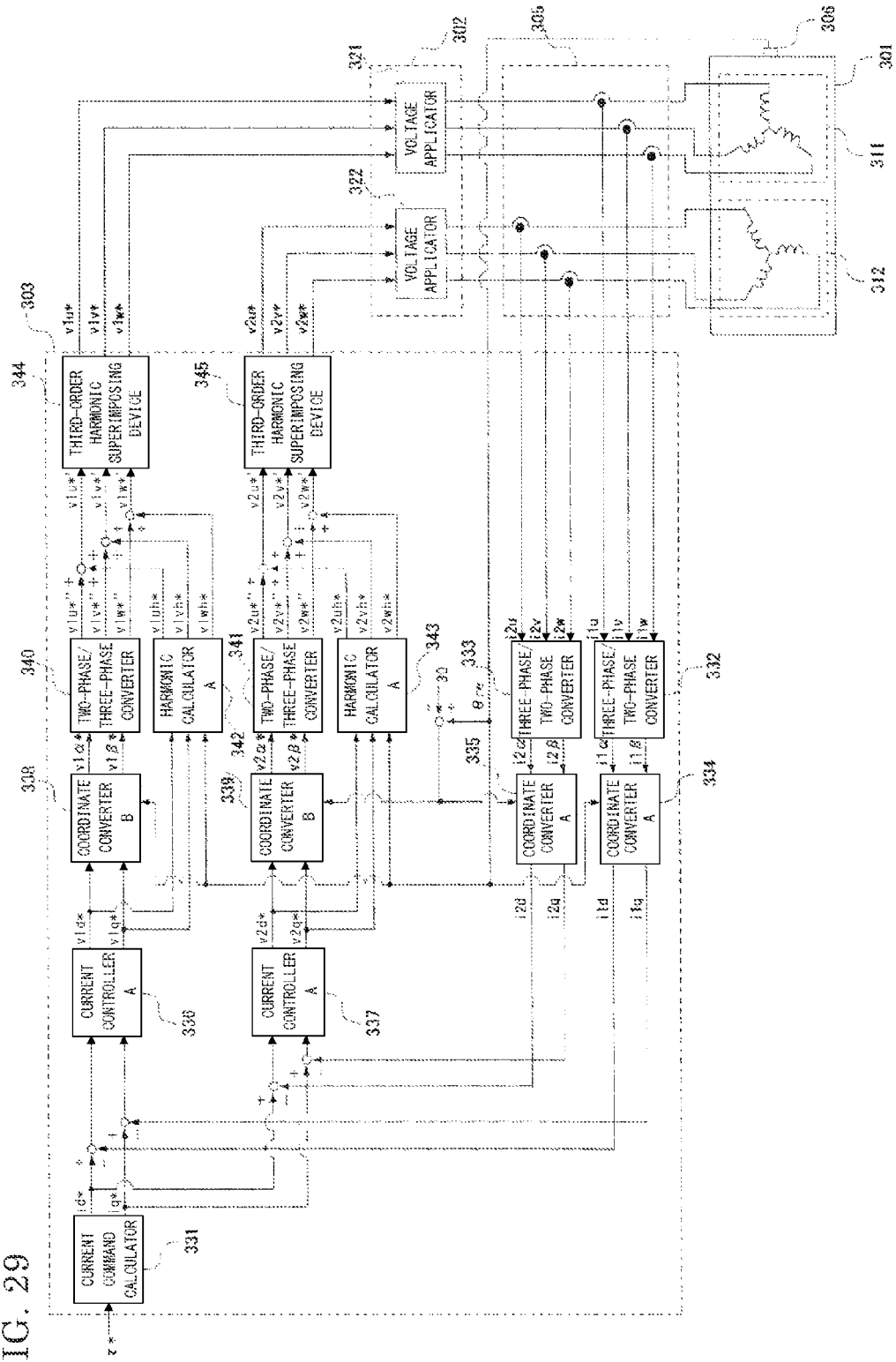
FIG. 29 is a block configuration diagram showing a motor drive device according to embodiment 4 of the present invention.

The above embodiment 3 is configured as shown in FIG. 28, whereas the present embodiment 4 is configured as shown in FIG. 29.

A difference from FIG. 28 is that harmonic calculators A342 and A343 are provided for calculating harmonic voltages v1uh*, v1vh*, v1wh*, v2uh*, v2vh*, and v2wh* based on the D-axis voltage commands v1d* and v2d*, the Q-axis voltage commands v1q* and v2q*, and the magnetic pole position θre of the motor, and the calculated harmonic voltages are added to the three-phase voltage commands v1u*''', v1v*''', v1w*''', v2u*''', v2v*''', and v2w*''' before the harmonic superimposition, and then the three-phase voltage commands v1u*, v1v*, v1w*, v2u*, v2v*, and v2w* after the harmonic superimposition are obtained.

The details will be described below.

The harmonic calculators A342 and A343 calculate fifth-order and seventh-order harmonic voltages having a phase of 180 degrees with respect to fundamental wave components of line-to-line voltages among the three-phase voltage commands before the harmonic superimposition.

For the first winding set 311, the harmonic calculator A342 calculates an amplitude V1dq of a voltage command in a rotational coordinate system by the following expression.

It is noted that V1dq corresponds to an effective value of line-to-line voltage.

[Mathematical 10]

$$V1dq = \sqrt{v1d^{*2} + v1q^{*2}} \quad \text{Expression 9}$$

Next, a phase $\theta 1vdq$ of the voltage command in the rotational coordinate system is calculated by the following expression.

[Mathematical 11]

$$\theta 1vdq = \tan^{-1}\left(\frac{v1q^*}{v1d^*}\right) \quad \text{Expression 10}$$

Here, based on expressions 7 and 8, the three-phase voltage commands $v1u^{*\prime\prime\prime}$, $v1v^{*\prime\prime\prime}$, and $v1w^{*\prime\prime\prime}$ before the harmonic superimposition are represented by the following expressions.

[Mathematical 12]

$$\begin{cases} v1u^{*\prime\prime\prime} = \sqrt{\frac{2}{3}}\, V1dq \cdot \cos(\theta re + \theta v1dq) \\ v1v^{*\prime\prime\prime} = \sqrt{\frac{2}{3}}\, V1dq \cdot \cos(\theta re + \theta v1dq - 120) \\ v1w^{*\prime\prime\prime} = \sqrt{\frac{2}{3}}\, V1dq \cdot \cos(\theta re + \theta v1dq + 120) \end{cases} \quad \text{Expression 11}$$

This expression using cosine wave is represented by the following expressions using sine wave.
[Mathematical 13]

$$\theta v1ph = \theta re + \theta v1dq + 90 \quad \text{Expression 12}$$

[Mathematical 14]

$$\begin{cases} v1u^{*\prime\prime\prime} = \sqrt{\frac{2}{3}}\, V1dq \cdot \sin(\theta v1ph) \\ v1v^{*\prime\prime\prime} = \sqrt{\frac{2}{3}}\, V1dq \cdot \sin(\theta v1ph - 120) \\ v1w^{*\prime\prime\prime} = \sqrt{\frac{2}{3}}\, V1dq \cdot \sin(\theta v1ph + 120) \end{cases} \quad \text{Expression 13}$$

Line voltages thereof are represented by the following expressions.
[Mathematical 15]

$$\theta v1ll = \theta v1ph + 30 \quad \text{Expression 14}$$

[Mathematical 16]

$$\begin{cases} v1uv^{*\prime\prime} = \sqrt{2}\, V1dq \cdot \sin(\theta v1ll) \\ v1vw^{*\prime\prime} = \sqrt{2}\, V1dq \cdot \sin(\theta v1ll - 120) \\ v1wu^{*\prime\prime} = \sqrt{2}\, V1dq \cdot \sin(\theta v1ll + 120) \end{cases} \quad \text{Expression 15}$$

Since the fifth-order and seventh-order harmonic voltages are superimposed with their phases being 180 degrees with respect to fundamental wave components of the line-to-line voltages, line-to-line voltages of the fifth-order and seventh-order harmonic voltages are calculated by the following expression.

Here, K5 and K7 are the ratios of the fifth-order and seventh-order harmonic voltage amplitudes to the fundamental wave components, respectively.

[Mathematical 17]

$$\begin{cases} v1uvh^* = \sqrt{2}\, V1dq \cdot \{K5 \cdot \sin(5\theta v1ll + 180) + K7 \cdot \sin(7\theta v1ll + 180)\} \\ v1vwh^* = \sqrt{2}\, V1dq \cdot \{K5 \cdot \sin(5(\theta v1ll - 120) + 180) + K7 \cdot \sin(7(\theta v1ll - 120) + 180)\} \\ v1wuh^* = \sqrt{2}\, V1dq \cdot \{K5 \cdot \sin(5(\theta v1ll + 120) + 180) + K7 \cdot \sin(7(\theta v1ll + 120) + 180)\} \end{cases} \quad \text{Expression 16}$$

The line-to-line voltages are converted to three-phase voltages, based on the fact that a sum of three phases is zero, as shown by the following expression.
The phases of the fifth-order and seventh-order harmonic voltages are changed by 180 degrees.

[Mathematical 18]

$$\begin{cases} v1uh^* = \sqrt{\frac{2}{3}}\, V1dq \cdot \{K5 \cdot \sin(5\theta v1ph) + K7 \cdot \sin(7\theta v1ph)\} \\ v1vh^* = \sqrt{\frac{2}{3}}\, V1dq \cdot \{K5 \cdot \sin 5(\theta v1ph - 120) + K7 \cdot \sin 7(\theta v1ph - 120)\} \\ v1wh^* = \sqrt{\frac{2}{3}}\, V1dq \cdot \{K5 \cdot \sin 5(\theta v1ph + 120) + K7 \cdot \sin 7(\theta v1ph + 120)\} \end{cases} \quad \text{Expression 17}$$

In the present embodiment, the fifth-order and seventh-order harmonic voltages are calculated based on this expression 17 and the relevant expressions 9 to 16.

For example, K5 is set at 6.2% and K7 is set at 0.8%.

For the second winding set, the harmonic calculator A343 performs similar processing.

After the fifth-order and seventh-order harmonic voltages are added to the three-phase voltage commands before the harmonic superimposition, the third-order harmonic superimposing devices 344 and 345 perform the same processing as the third-order harmonic superimposing devices 344 and 345 of embodiment 3, to obtain the three-phase voltage commands $v1u^*$, $v1v^*$, $v1w^*$, $v2u^*$, $v2v^*$, and $v2w^*$ after the harmonic superimposition.

In order to calculate harmonic voltages for the second winding set 312 in accordance with expression 17 of the harmonic voltages for the first winding set 311, $\theta v1ph$ is replaced with $\theta v2ph$ shown by the following expression.

This is because there is a phase difference by 30 degrees between the winding sets and therefore the magnetic pole position $\theta re$ used in the control has the corresponding phase difference by 30 degrees.
[Mathematical 19]

$$\theta v2ph = \theta v1ph - 30 \quad \text{Expression 18}$$

If this expression is substituted into $\theta v1ph$ in expression 17, regarding fifth order, the phase is multiplied by five as shown by the following expression.
[Mathematical 20]

$$5\theta v2ph = 5\theta v1ph - 150$$

Thus, it is found that the phase is shifted by 150 degrees relative to the harmonic for the first winding set 311.

Similarly, regarding seventh-order harmonic, it is found that the phase is shifted by 7×30=210 degrees. That is, between the first system for the first winding set 311 and the second system for the second winding set 312, a phase difference by 150 degrees is given for fifth-order harmonic, and a phase difference by 210 degrees is given for seventh-order harmonic.

Figure 30:
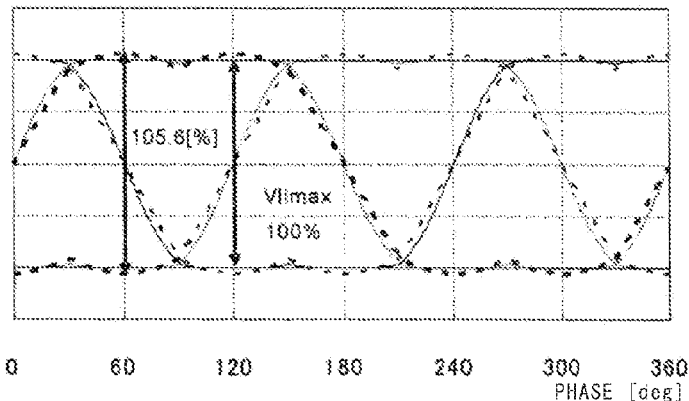
FIG. 30 is a waveform diagram showing three-phase voltage commands and line-to-line voltages thereof in embodiment 4 of the present invention.
Figure 30:
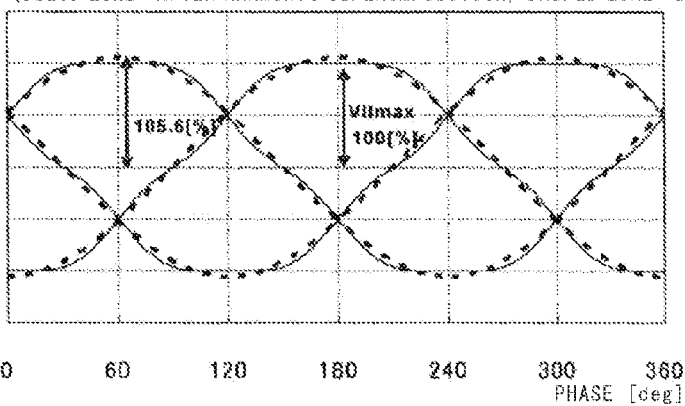

FIG. 30 shows waveforms of three-phase voltage commands and line-to-line voltages thereamong before and after the harmonic superimposition, in the case where fundamental wave components of the three-phase voltage commands are 105.6%.

Here, the percentage in the case where the line-to-line voltage amplitudes of the fundamental wave components are equal to the maximum line-to-line voltage amplitude Vllmax that the voltage application means 302 can output is defined as 100%.

For comparison, the three-phase voltage commands before the harmonic superimposition are also shown by waveforms having been processed by the third-order harmonic superimposing devices.

Before the harmonic superimposition, if the fundamental wave components of the three-phase voltage commands exceed 100%, the line-to-line voltage amplitudes thereof exceed the maximum voltage amplitude Vllmax that the voltage application means 302 can output, and therefore voltage according to the voltage command cannot be outputted.

On the other hand, after the harmonic superimposition, peak values of the line-to-line voltage amplitudes are reduced and do not exceed Vllmax. Therefore, a fundamental wave component that is 105.6% can be outputted, whereby an effective value of applied voltage can be improved and motor output is improved.

Generally, the superimposed fifth-order and seventh-order harmonics cause sixth-order torque ripple.

In the present embodiment, the two winding sets 311 and 312 of the brushless motor 301 have a phase difference by 30 degrees with respect to a fundamental wave component. Therefore, a phase difference between sixth-order torque ripples for the two winding sets is 180 degrees, so that they are cancelled.

On the other hand, in conventional case of rectangular wave or trapezoidal wave, harmonics for eleventh order, thirteenth order, seventeenth order, nineteenth order, etc. are contained in addition to the fifth-order and seventh-order harmonics, and torque ripples of twelfth order, eighteenth order, etc. occur. However, in the case where a multiplex winding motor has a small number of winding sets, these torque ripples cannot be cancelled.

In the present embodiment, motor output can be improved without causing harmonics for eleventh order, thirteenth order, seventeenth order, nineteenth order, etc. or torque ripples due to these harmonics.

Thus, in the present embodiment, a phase difference between the winding sets and the corresponding phase difference in the magnetic pole position used in the control are configured to reduce torque ripple caused by voltage or current having a trapezoidal waveform.

Figure 31:
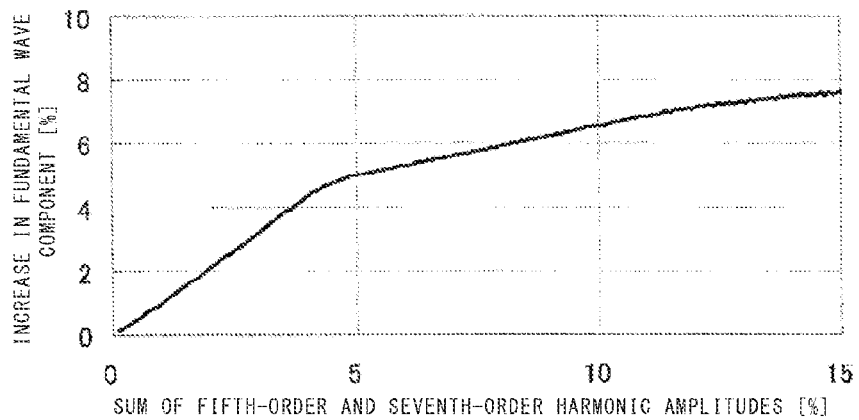
FIG. 31 is a graph showing increase in a fundamental wave component of induced voltage from 100% in the case where a sum of the amplitudes of fifth-order and seventh-order harmonics with respect to the fundamental wave component of induced voltage is changed, in embodiment 4 of the present invention.

In the present embodiment, FIG. 31 shows increase in a fundamental wave component from 100% in the case where a sum of amplitudes of fifth-order and seventh-order harmonic voltages is changed, under the condition that the line-to-line voltage amplitude does not exceed Vllmax.

Figure 32:
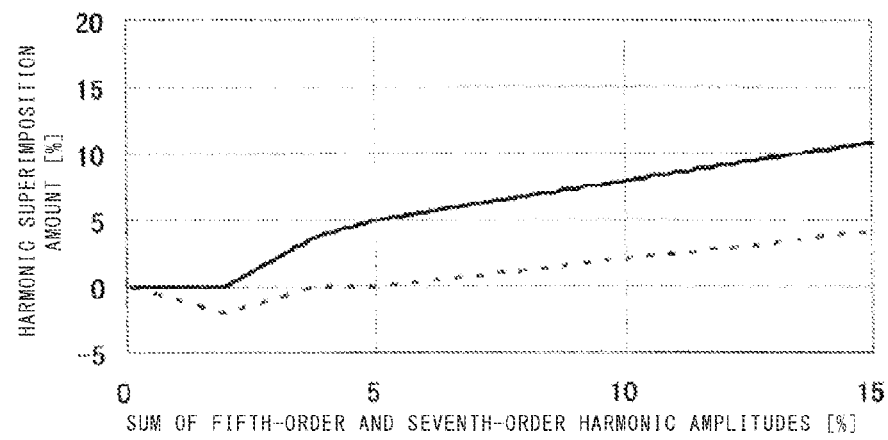
FIG. 32 is a graph showing harmonic superimposition amounts by which a fifth-order harmonic component and a seventh-order harmonic component are superimposed, in the case where a sum of the amplitudes of the fifth-order and seventh-order harmonics with respect to a fundamental wave component of induced voltage is changed, in embodiment 4 of the present invention.

FIG. 32 shows the respective amounts of the fifth-order harmonic component and the seventh-order harmonic component that are superimposed.

Superimposing the fifth-order and seventh-order harmonic voltages can increase a fundamental wave component even under the same line-to-line voltage amplitude Vllmax.

Figure 33:
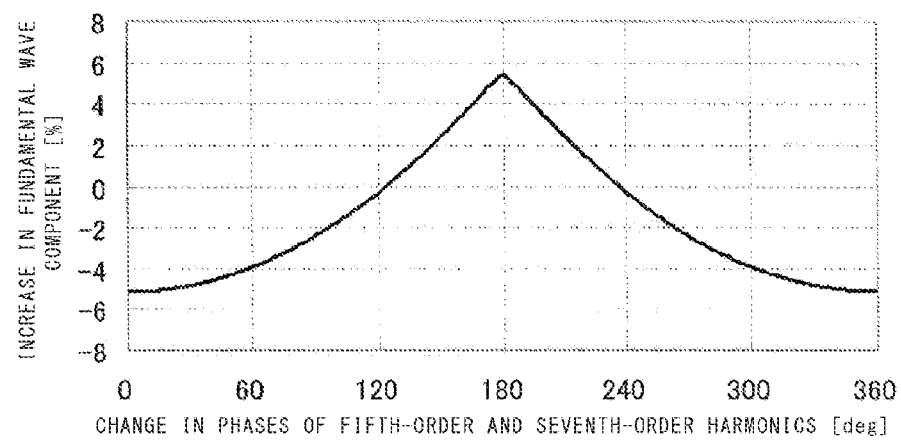
FIG. 33 is a graph showing increase in a fundamental wave component of induced voltage from 100% in the case where phases of fifth-order and seventh-order harmonics with respect to the fundamental wave component of induced voltage are changed, in embodiment 4 of the present invention.

In the present embodiment, FIG. 33 shows increase in a fundamental wave component from 100% in the case where the phases of the fifth-order and seventh-order harmonic voltages are changed from 180 degrees with respect to the fundamental wave component of line-to-line voltage, under the condition that the line-to-line voltage amplitude does not exceed Vllmax.

It is noted that the phases of the fifth-order and seventh-order harmonic voltages are equal to each other.

When the phases are 180 degrees with respect to the fundamental wave component of line-to-line voltage, the fundamental wave component can be most increased.

In a phase range between 180±60 degrees, the fundamental wave component can be increased, and in a phase range between 180±30 degrees (approximately 180 degrees), approximately a half of the maximum effect can be expected.

Thus, without causing harmonics for eleventh order, thirteenth order, seventeenth order, nineteenth order, etc. or torque ripple due to these harmonics, a trapezoidal waveform is generated and the fundamental wave component is increased, that is, motor output can be improved.

As described above, the present embodiment provides novel effects of, by effectively utilizing fifth-order and seventh-order harmonic components, generating a trapezoidal voltage waveform and increasing a fundamental wave component, that is, improving motor output, while suppressing torque ripple due to induced voltage and applied voltage that have trapezoidal waveforms.

The motor drive device of the present embodiment can be applied to a steering of a vehicle to configure an electric power steering device, thereby providing effects of improving output by induced voltage having a trapezoidal waveform and applied voltage having a trapezoidal waveform, thereby reducing load on a driver, and suppressing torque ripple by a phase difference between systems, thereby reducing strangeness that a driver feels.

Embodiment 5

Figure 34:
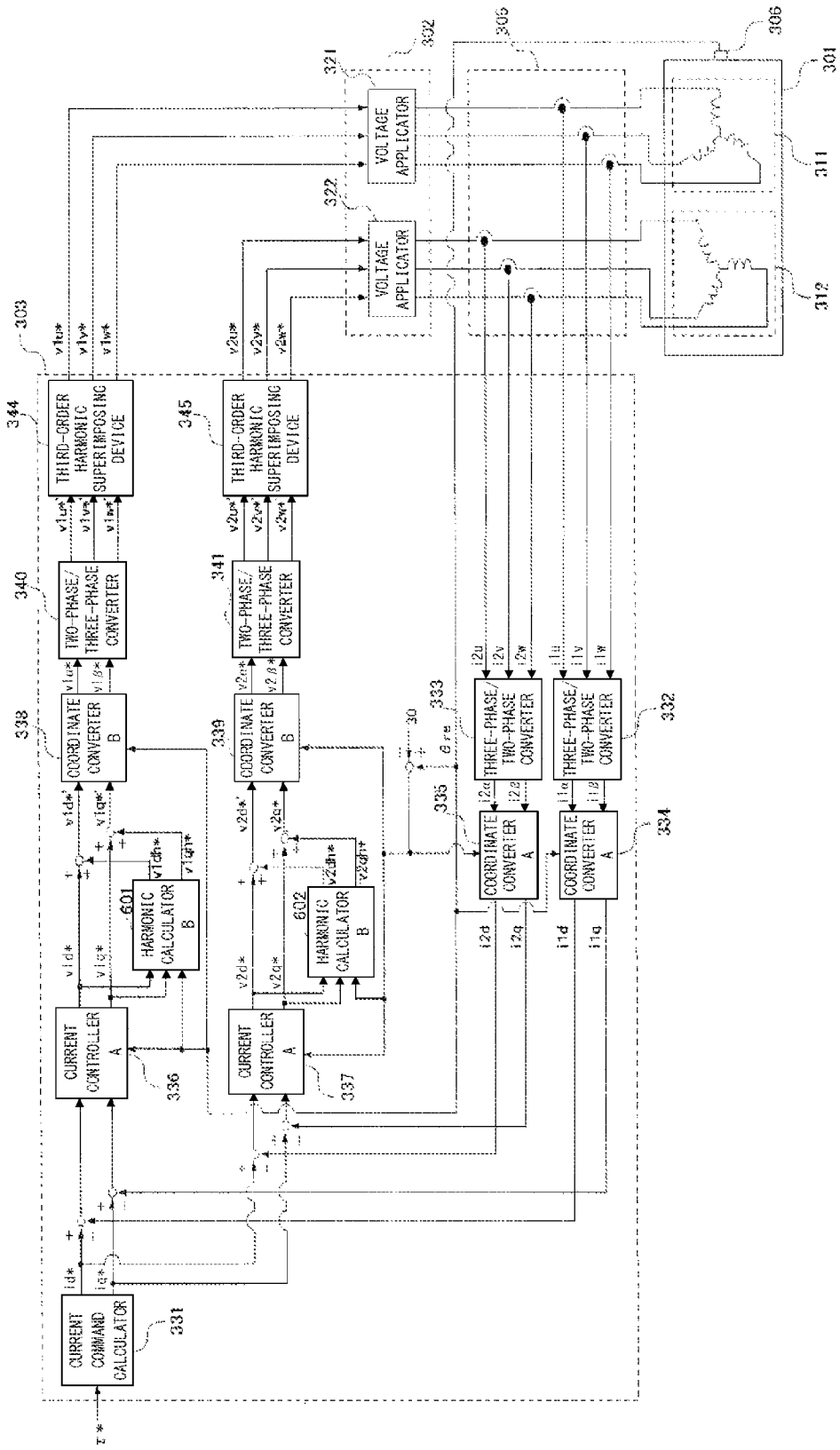
FIG. 34 is a block configuration diagram showing a motor drive device according to embodiment 5 of the present invention.

The above embodiment 4 is configured as shown in FIG. 29, whereas the present embodiment 5 is configured as shown in FIG. 34.

A difference from FIG. 29 is that harmonic calculators B601 and B602 are provided instead of the harmonic calculators A342 and A343, DQ-axes harmonic voltages $v1dh^*$, $v1qh^*$, $v2dh^*$, and $v2qh^*$ are calculated based on the D-axis voltage commands $v1d^*$ and $v2d^*$ and the Q-axis voltage command $v1q^*$ and $v2q^*$ outputted from the current controllers A336 and A337 and the magnetic pole position θre of the motor, and the DQ-axes harmonic voltages are added to the D-axis voltage commands $v1d^*$ and $v2d^*$ and the Q-axis voltage commands $v1q^*$ and $v2q^*$, whereby the D-axis voltage commands $v1d^{*\prime}$ and $v2d^{*\prime}$ and the Q-axis voltage commands $v1q^{*\prime}$ and $v2q^{*\prime}$ after the harmonic superimposition are calculated.

The details will be described below.

Expression 17 of the harmonic voltages for UVW voltages shown in the above embodiment 4 is converted to values on dq axes, using conversion equations of expression 7 and expression 8, as shown by the following expression.

[Mathematical 21]

$$\begin{cases} v1dh^* = V1dq \cdot Kd6 \cdot \sin(6\theta v1ph) \\ v1qh^* = V1dq \cdot Kq6 \cdot \cos(6\theta v1ph) \end{cases} \quad \text{Expression 19}$$

Here, Kd6 and Kq6 are defined by the following expression.

[Mathematical 22]

$$\begin{cases} Kd6 = K5 + K7 \\ Kq6 = -K5 + K7 \end{cases} \quad \text{Expression 20}$$

$\theta v1ph$ in expression 19 is represented by expression 12.

The harmonic calculator B601 performs calculation by expression 19, to obtain the dq-axes harmonic voltages v1$dh^*$ and v1$qh^*$. The harmonic calculator B602 performs similar calculation with $\theta re = \theta re - 30$ substituted, to obtain the dq-axes harmonic voltages v2$dh^*$ and v2$qh^*$.

In order to calculate harmonic voltages for the second winding set 312 in accordance with expression 19 of the harmonic voltages for the first winding set 311, $\theta v1ph$ is replaced with $\theta v2ph$ shown by expression 18.

This is because $\theta re$ has a phase difference by 30 degrees.

If expression 18 is substituted into $\theta v1ph$ in expression 19, the phase for sixth order is multiplied by six as shown by the following expression.

[Mathematical 23]

$$6\theta v2ph = 6\theta v1ph - 180$$

Thus, it is found that the phase is shifted by 180 degrees relative to the harmonic for the first winding set 311.

That is, between the first system and the second system, a phase difference by 180 degrees is given for sixth-order harmonics on dq-axes.

Generally, the superimposed sixth-order harmonics on dq-axes cause sixth-order torque ripple.

In the present embodiment, the two winding sets of the brushless motor 301 have a phase difference by 30 degrees with respect to a fundamental wave component. Therefore, a phase difference between sixth-order torque ripples for the two winding sets is 180 degrees, so that they are cancelled.

The harmonic voltage shown in the present embodiment is voltage equivalently converted from the harmonic voltage shown in embodiment 4. Therefore, the three-phase voltage commands and the line-to-line voltages have the same waveforms as in embodiment 4, and as a result, the same effect of improving output while suppressing torque ripple is obtained.

In embodiment 4, it is necessary to calculate fifth-order and seventh-order components for three phases of UVW, i.e., a total of six terms, in expression 17. However, in the present embodiment, it is only necessary to calculate two terms of sixth-order components for dq axes in expression 19, and therefore an effect of reducing a calculation amount is obtained.

As described above, the present embodiment provides novel effects of, by using a sixth-order harmonic component on dq axes and by effectively utilizing fifth-order and seventh-order harmonic components, generating a trapezoidal voltage waveform and increasing a fundamental wave component, that is, improving motor output, and reducing a calculation amount and reducing the cost of a CPU, while suppressing torque ripple due to induced voltage and applied voltage that have trapezoidal waveforms.

Although the present embodiment has shown a sixth-order harmonic component on dq axes, needless to say, the above description applies in any rotational coordinate system.

The motor drive device of the present embodiment can be applied to a steering of a vehicle to configure an electric power steering device, thereby providing effects of improving output by induced voltage having a trapezoidal waveform and applied voltage having a trapezoidal waveform, thereby reducing load on a driver, suppressing torque ripple by a phase difference between systems, thereby reducing strangeness that a driver feels, and reducing a calculation amount, thereby reducing the cost of a CPU.

Embodiment 6

Figure 35:
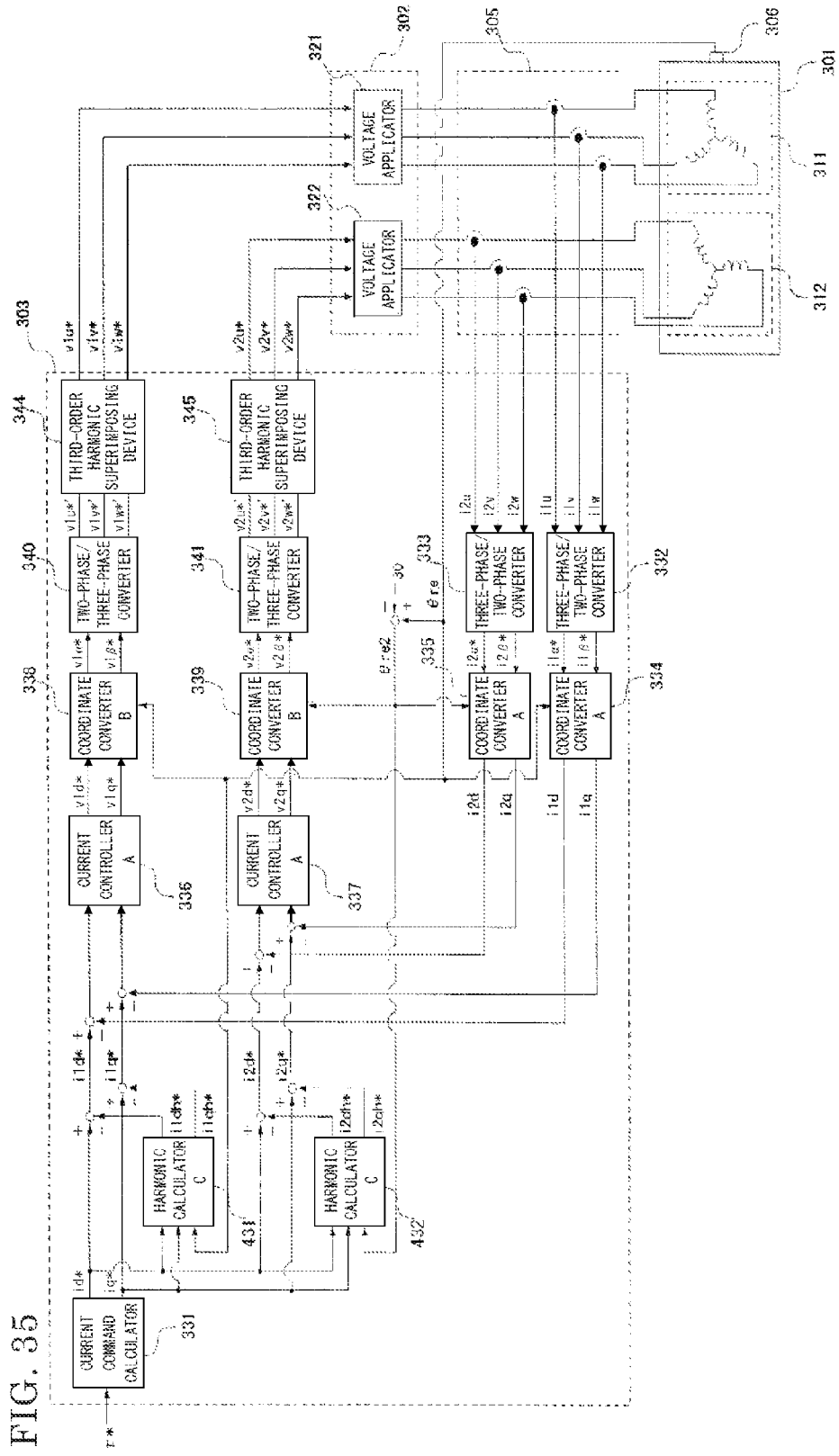
FIG. 35 is a block configuration diagram showing a motor drive device according to embodiment 6 of the present invention.

The above embodiment 5 is configured as shown in FIG. 34, whereas the present embodiment 6 is configured as shown in FIG. 35.

A difference from FIG. 34 is that harmonic calculators C431 and C432 are provided instead of the harmonic calculators B601 and B602, a d-axis harmonic current i1$dh^*$ and a q-axis harmonic current i1$qh^*$ are calculated based on the D-axis current command id*' and the Q-axis current command iq*' outputted from the current command calculator 331 and the magnetic pole position $\theta re$ of the motor, and the dq-axes harmonic currents are added to the d-axis current command id*' and the q-axis current command iq*', whereby the d-axis current command i1$d^*$ and the q-axis current command i1$q^*$ after the harmonic superimposition are calculated.

The details will be described below.

The harmonic calculators C431 and C432 calculate, for the d-axis current command id*' and the q-axis current command iq*' before the harmonic superimposition, fifth-order harmonic currents having a phase of 180 degrees with respect to a fundamental wave component of the line current between the d-axis current command id*' and the q-axis current command iq*', in a rotational coordinate system.

For the first winding set 311, the harmonic calculator C431 calculates an amplitude I1$dq$ of the current command in the rotational coordinate system by the following expression.

It is noted that I1$dq$ corresponds to an effective value of the line current multiplied by the square root of 3.

[Mathematical 24]

$$I1dq = \sqrt{i1d^{*'2} + i1q^{*'2}} \quad \text{Expression 21}$$

Next, a phase $\theta i1dq$ of the current command in the rotational coordinate system is calculated by the following expression.

[Mathematical 25]

$$\theta i1dq = \tan^{-1}\left(\frac{i1q^{*'}}{i1d^{*'}}\right) \quad \text{Expression 22}$$

As in expression 12 in embodiment 4, the phase is set as shown by the following expression.

[Mathematical 26]

$$\theta i1ph = \theta re + \theta i1dq + 90 \quad \text{Expression 23}$$

Similarly to the calculation of the harmonic voltages in embodiment 4 and embodiment 5, the harmonic currents are calculated as shown by the following expression.

[Mathematical 27]

$$\begin{cases} i1dh^* = I1dq \cdot Kid6 \cdot \sin(6\theta i1ph) \\ i1qh^* = I1dq \cdot Kiq6 \cdot \cos(6\theta i1ph) \end{cases} \quad \text{Expression 24}$$

Here, if Kid6 and Kiq6 are set at the same values as Kd6 and Kq6 in embodiment 5, increase in a fundamental wave component of current can be made equal to increase in a fundamental wave component of voltage in embodiment 5, or if Kid6 and Kiq6 are set at values obtained by converting Kd6 and Kq6 in consideration of impedances of the motor windings and the voltage applicators, increase in a fundamental wave component of voltage can be made equal to increase in a fundamental wave component of voltage in embodiment 5.

Therefore, the present embodiment can provide the same effect as in embodiment 5.

Embodiment 4 has shown a method of superimposing harmonic voltages on voltage commands for UVW phases. However, in the case of configuring a control system in which current commands for UVW phases are followed, the same effect can be obtained even by a configuration in which harmonic voltages are superimposed on current commands, that is, the current commands for UVW phases, as in the present embodiment.

Embodiment 7

Embodiment 7 will describe a cycle in which currents i1u, i1v, i1w, i2u, i2v, and i2w flowing in the brushless motor 301 are detected by current detection means 305 and are inputted to the control means 303 in FIG. 35.

The harmonic calculators C431 and C432 output harmonic current commands, and sixth-order high-frequency currents on dq axes (i1d, i1q, i2d, i2q) flow in the brushless motor 301.

If the sixth-order harmonic components on the dq coordinate axes are converted from dq axes into a three-phase coordinate system, the sixth-order harmonic components are converted into a fifth-order harmonic component and a seventh-order harmonic component. In light of this, if the currents (i1d, i1q, i2d, i2q) on dq axes contain sixth-order high-frequency currents, the currents i1u, i1v, i1w, i2u, i2v, and i2w flowing in the brushless motor 301 contain fifth-order harmonic current and seventh-order harmonic current.

A condition for causing the sixth-order harmonic currents contained in the currents (i1d, i1q, i2d, i2q) on dq axes flowing in the brushless motor 301 to follow the current command values represented by expression 12 is that detection of the currents i1u, i1v, i1w, i2u, i2v, and i2w by the control means 303 is performed in a cycle equal to or shorter than a cycle needed for accurately detecting a fifth-order harmonic component and a seventh-order harmonic component contained in the currents i1u, i1v, i1w, i2u, i2v, and i2w.

In the present embodiment, the control means 303 performs the detection of the currents i1u, i1v, i1w, i2u, i2v, and i2w such that a Nyquist frequency for the current detection cycle is higher than the frequency of seventh-order harmonic currents contained in the currents i1u, i1v, i1w, i2u, i2v, and i2w.

In embodiment 1, if the number of poles of the brushless motor 301 is 8 and the rotation rate is 3000 r/min, seventh-order harmonic current becomes 1400 Hz as shown by the following expression.

$$f7 = 3000 \div 120 \times 8 \times 7 = 1400 \text{ Hz} \qquad \text{Expression 25}$$

Accordingly, in the present embodiment, based on the cycle of the seventh-order harmonic current which is about 700 μs (≈1/1400 Hz), the current detection cycle is set at 350 μs or shorter.

Since a Nyquist frequency for the current detection cycle 350 μs is about 1430 Hz (≈1/(2×350 μs)), the Nyquist frequency becomes equal to or higher than about 1430 Hz when the current detection cycle is equal to or shorter than 350 μs, and therefore the frequency 1400 Hz of the seventh-order harmonic current can be extracted.

The detection of the currents i1u, i1v, i1w, i2u, i2v, and i2w may be performed with a cycle equal to or shorter than ⅕ times (140 μs) of the cycle (about 700 μs) of the seventh-order harmonic current, whereby detection accuracy can be further improved.

Hereinafter, effects obtained by setting the current detection cycle at 350 μs or shorter, or more preferably, 140 μs or shorter in the present embodiment will be described.

For example, in a control system using a high-frequency current command, high-frequency current can be made to follow the high-frequency current command.

Also in a control system not using a high-frequency current command, the following effects are obtained.

A seventh-order harmonic component contained in induced voltage of the brushless motor 301 is a source to cause seventh-order harmonic current.

In the case where the control means 303 cannot detect the seventh-order harmonic current, it is impossible to control the seventh-order harmonic current to be a desired value. However, if the control means 303 can detect the seventh-order harmonic current, it becomes possible to perform feedback control based on the seventh-order harmonic current. As a result, it also becomes possible to control the seventh-order harmonic current to be a desired value.

It is noted that, also in the case of setting the current detection cycle to be longer than 140 μs or longer than 350 μs, in a control system using a high-frequency current command, an effect of improving the motor output is kept because high-frequency current flows, though accuracy with which harmonic current follows a harmonic current command is deteriorated.

The above description in the present embodiment has described the case of application to the configuration of embodiment 6 shown in FIG. 35. However, needless to say, in embodiments 3 to 5, setting the current detection cycle at 350 μs or shorter, or more preferably, 140 μs or shorter provides effects of improving detection accuracy for the currents i1u, i1v, i1w, i2u, i2v, and i2w and improving accuracy of output (V1d*, V1q*) of the current controller A336 and output (V2d*, V2q*) of the current controller A337, thereby improving the motor output with high accuracy.

Embodiment 8

Figure 36:
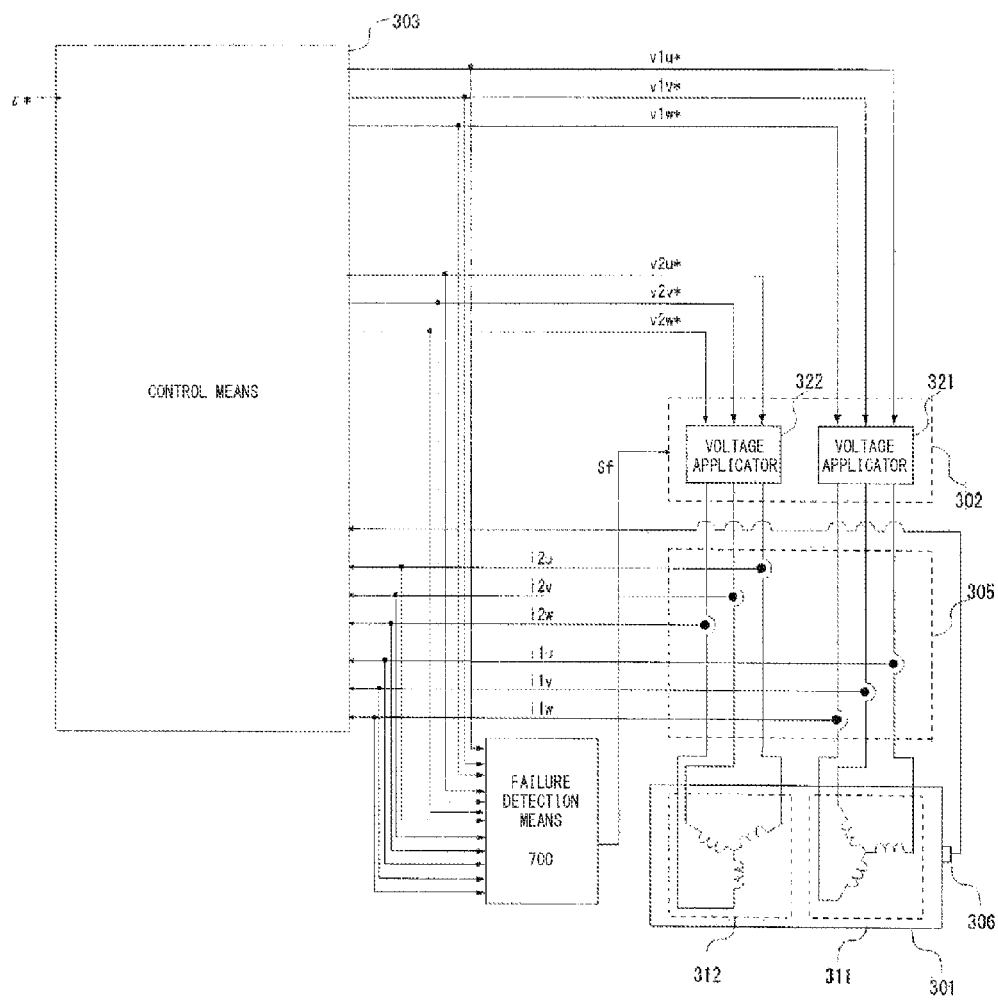
FIG. 36 is a block configuration diagram showing a motor drive device according to embodiment 8 of the present invention.

FIG. 36 is a block configuration diagram showing a motor drive device according to embodiment 8 of the present invention.

A difference from FIG. 28 is that failure detection means 700 is provided for specifying a failed system from a voltage command and a current value, and the failure detection means 700 gives a failed-side output stop command for stopping voltage application, to the voltage applicators in the specified system.

The details will be described below.

The failure detection means 700 specifies a failed system from the three-phase voltage commands v1u*, v1v*, v1w*, v2u*, v2v*, and v2w* and the detected current values i1u, i1v, i1w, i2u, i2v, and i2w.

The specifying method may be a conventionally used method. For example, if a state in which v1u* is equal to or greater than predetermined voltage and i1u is equal to or smaller than predetermined current has continued for a predetermined time or longer, it is specified that failure has occurred in U phase of the first system for the first winding set 311.

Likewise, if a state in which v1v* is equal to or greater than predetermined voltage and i1v is equal to or smaller than predetermined current has continued for a predetermined time or longer, it is specified that failure has occurred in V phase of the first system.

The same applies for W phase.

Likewise, also in the second system for the first winding set 311, for example, if a state in which v2u* is equal to or greater than predetermined voltage and i2u is equal to or smaller than predetermined current has continued for a predetermined time or longer, it is specified that failure has occurred in U phase of the second system.

The same applies for V phase and W phase.

In the case where it is specified that failure has occurred in any of U, V, and W phases of the first system, a command value for causing the voltage applicator 322 in the second system to continue voltage application and causing the voltage applicator 321 in the first system to stop voltage application is substituted into a failed-side output stop command Sf.

On the other hand, in the case where it is specified that failure has occurred in any of U, V, and W phases of the second system, a command value for causing the voltage applicator 321 in the first system to continue voltage application and causing the voltage applicator 322 in the second system to stop voltage application is substituted into the failed-side output stop command Sf.

The failure detection means 700 gives the failed-side output stop command Sf to the voltage applicators 321 and 322, and the voltage applicators 321 and 322 continue or stop voltage application in accordance with the command.

Thus, when one of the two systems has failed, output of the failed system is stopped and output of the normal system that has not failed is continued.

In the present embodiment, in a normal state, high output can be obtained while torque ripples in the first system and the second system are cancelled by each other, and when one system has failed, since only output of the failed system is stopped, the effect of cancelling torque ripples in the first system and the second system is lost, and therefore control in the normal system can be continued while torque ripple is occurring.

Therefore, while operation is continued with a half of normal output, an effect of allowing an operator who handles the motor drive device to notice abnormality owing to the torque ripple that is occurring is obtained.

The motor drive device of the present embodiment can be applied to a steering of a vehicle to configure an electric power steering device, whereby, when one system has failed, only output of the failed system is stopped and output of the normal system can be continued. Therefore, effects are obtained in which strangeness that a driver feels when the failure has occurred can be reduced, and the driver can notice abnormality owing to torque ripple caused by operation of one system alone, thereby enabling immediate sending of the vehicle for repair.

Embodiment 9

Embodiment 9 will describe a specific example of the voltage application means 302 of embodiments 3 to 8.

Figure 37:
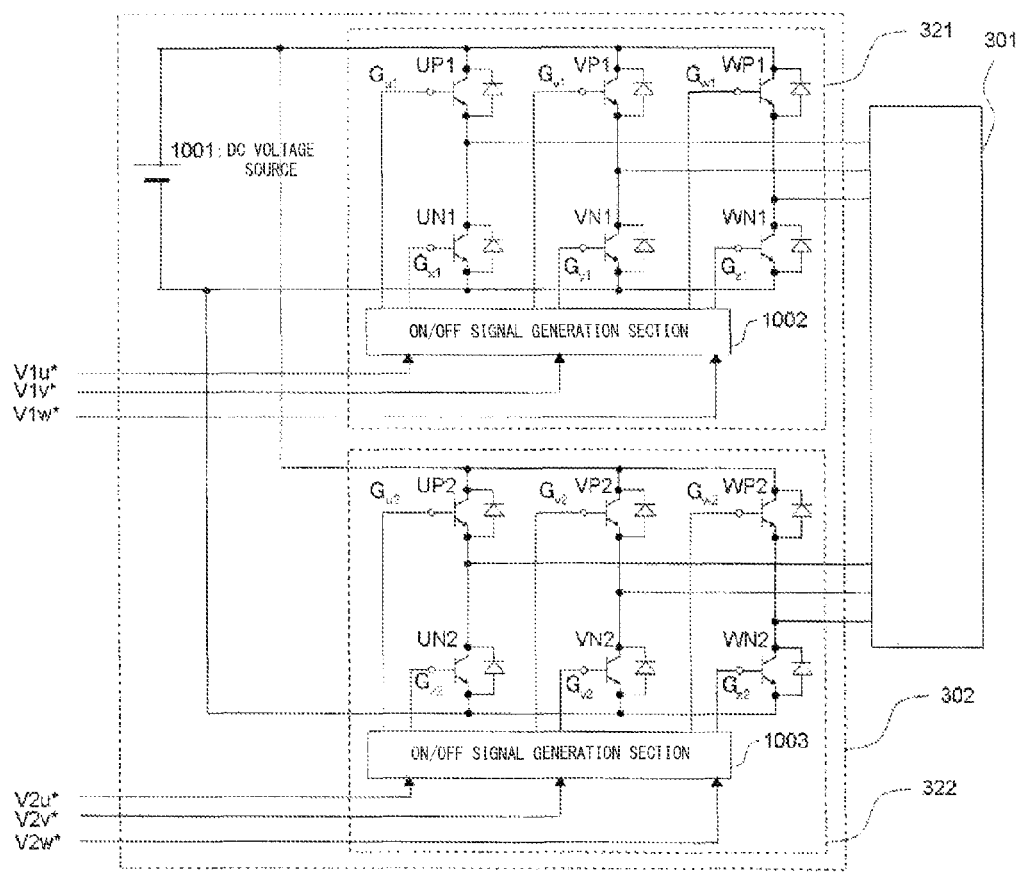
FIG. 37 is a block configuration diagram showing voltage application means according to embodiment 9 of the present invention.

FIG. 37 shows an internal configuration diagram of the voltage application means 302 of the present embodiment.

The voltage application means 302 is composed of the voltage applicator 321 for applying voltage to the brushless motor 301 based on a DC voltage source 1001 and the first three-phase voltage commands v1u*, v1v*, and v1w*, and the voltage applicator 322 for applying voltage to the brushless motor 301 based on the DC voltage source 1001 and the second three-phase voltage commands v2u*, v2v*, and v2w*.

Operation of the voltage applicator 321 will be described.

The first three-phase voltage commands v1u*, v1v*, and v1w* are inputted to an ON/OFF signal generation section 1002. Based on the first three-phase voltage commands v1u*, v1v*, and v1w*, the ON/OFF signal generation section 1002 generates ON/OFF signals Gu1 to Gz1 for self-turn-off switching elements in power devices UP1 to WN1 composed of the self-turn-off switching elements and free wheel diodes.

Figure 38:
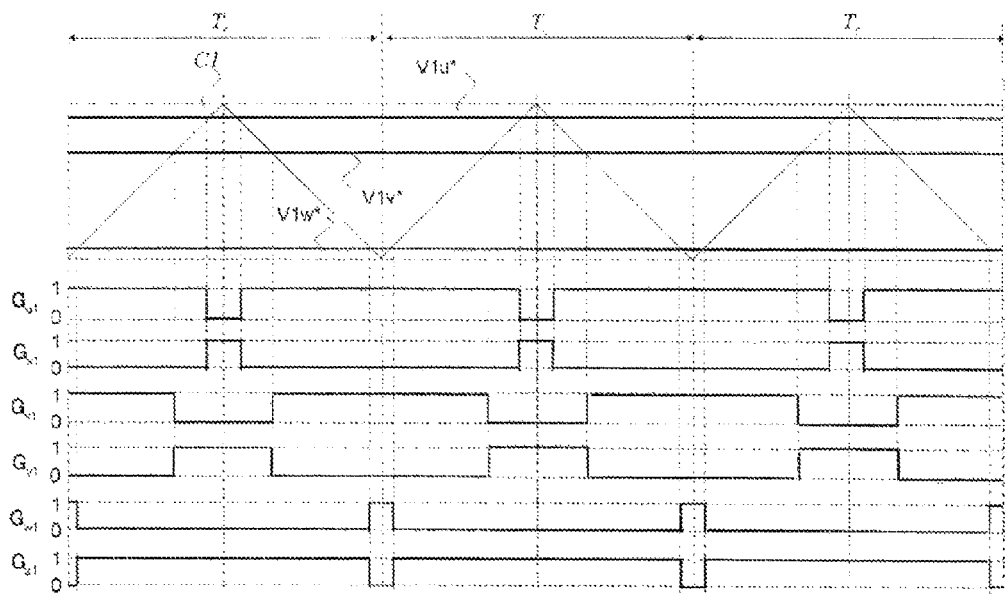
FIG. 38 is an explanation diagram showing a relationship between first three-phase voltage commands and ON/OFF signals in embodiment 9 of the present invention.

FIG. 38 is a diagram showing the relationship between the first three-phase voltage commands v1u*, v1v*, and v1w* and the ON/OFF signals Gu1 to Gz1.

The first three-phase voltage commands v1u*, v1v*, and v1w* are compared with a carrier triangular wave C1. If the first three-phase voltage commands v1u*, v1v*, and v1w* are greater than the carrier C1, Gu1, Gv1, and Gw1 are turned on and Gx1, Gy1, and Gz1 are turned off, respectively.

On the other hand, if the first three-phase voltage commands v1u*, v1v*, and v1w* are smaller than the carrier C1, Gx1, Gy1, and Gz1 are turned on and Gu1, Gv1, and Gw1 are turned off, respectively.

Based on the ON/OFF signals Gu1 to Gz1, the power devices UP1 to WN1 convert DC voltage outputted from the DC voltage source 1001 to AC voltage having a pulse width according to the first three-phase voltage commands v1u*, v1v*, and v1w*, and applies the AC voltage to the brushless motor 301.

Operation of the voltage applicator 322 will be described.

The second three-phase voltage commands v2u*, v2v*, and v2w* are inputted to an ON/OFF signal generation section 1003.

Based on the second three-phase voltage commands v2u*, v2v*, and v2w*, the ON/OFF signal generation section 1003 generates ON/OFF signals Gu2 to Gz2 for self-turn-off switching elements in power devices UP2 to WN2 composed of the self-turn-off switching elements and free wheel diodes.

Figure 39:
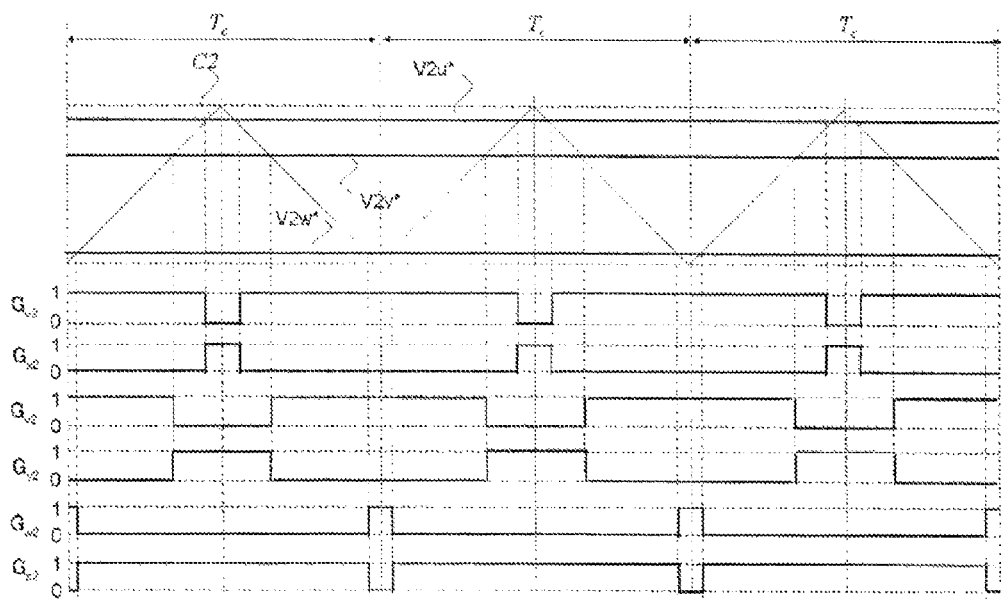
FIG. 39 is an explanation diagram showing a relationship between second three-phase voltage commands and ON/OFF signals in embodiment 9 of the present invention.

FIG. 39 is a diagram showing the relationship between the second three-phase voltage commands v2u*, v2v*, and v2w* and the ON/OFF signals Gu2 to Gz2.

The second three-phase voltage commands v2u*, v2v*, and v2w* are compared with a carrier triangular wave C2. If the second three-phase voltage commands v2u*, v2v*, and v2w* are greater than the carrier C2, Gu2, Gv2, and Gw2 are turned on and Gx2, Gy2, and Gz2 are turned off, respectively.

On the other hand, if the second three-phase voltage commands v2u*, v2v*, and v2w* are smaller than the carrier C2, Gx2, Gy2, and Gz2 are turned on and Gu2, Gv2, and Gw2 are turned off, respectively.

Based on the ON/OFF signals Gu2 to Gz2, the power devices UP2 to WN2 apply voltage having a pulse width according to the second three-phase voltage commands v2u*, v2v*, and v2w*, to the brushless motor 301.

The present embodiment will describe a frequency fc (cycle Tc) of the carrier triangular waves C1 and C2 of the inverters for allowing the voltage application means 302 to accurately output voltages according to the first three-phase voltage commands v1u*, v1v*, and v1w* and the second three-phase voltage commands v2u*, v2v*, and v2w* in the case where the voltage commands contain fifth-order harmonic voltage and seventh-order harmonic voltage in embodiments 3 to 8.

Figure 40:
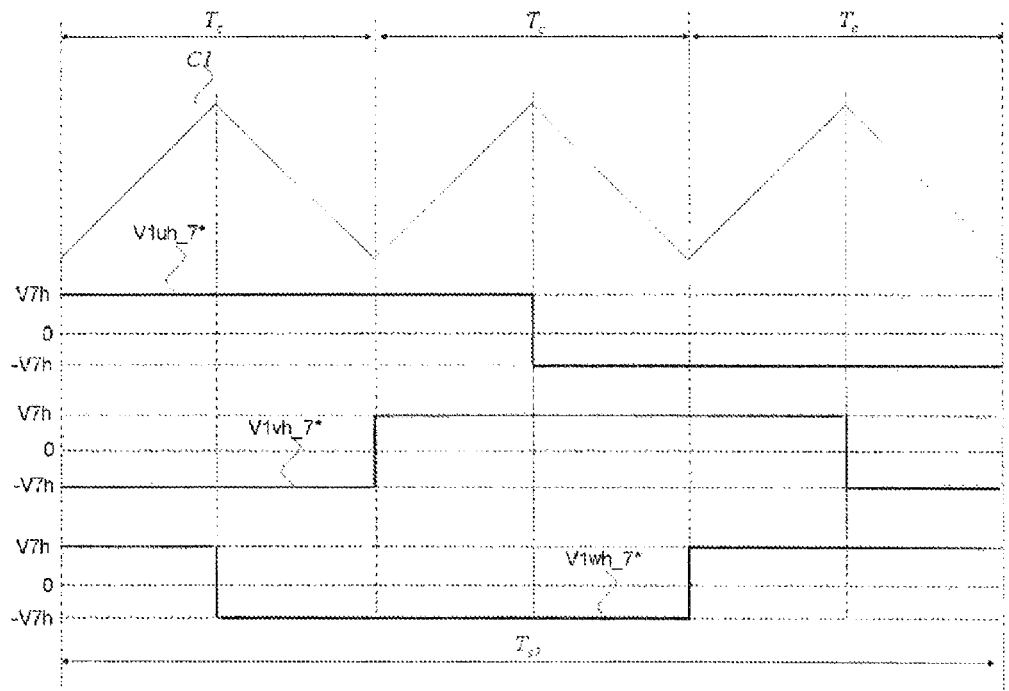
FIG. 40 is an explanation diagram showing a relationship between a carrier triangular wave and seventh-order harmonic voltages contained in voltage commands in embodiment 9 of the present invention.

FIG. 40 is a diagram showing the relationship between the carrier triangular wave C1 and seventh-order harmonic voltages v1uh_7*, v1vh_7*, and v1wh_7* contained in the voltage commands.

The seventh-order harmonic voltages v1uh_7*, v1vh_7*, and v1wh_7* are three-phase AC voltages having an amplitude V7h and phase differences by 120 degrees from each other.

Calculation of the seventh-order harmonic voltages is performed for every half cycle of the carrier wave, and the carrier frequency fc is set to be equal to or higher than three times the frequency f7 of the seventh-order harmonic voltages v1uh_7*, v1vh_7*, and v1wh_7*, or the cycle Tc of the carrier wave is set to be equal to or shorter than ⅓ of a cycle Ts7 of the seventh-order harmonic voltages.

Here, a specific example of numerical values will be described.

In the case where the number of poles of the brushless motor 301 is 8 and the rotation rate is 3000 r/min, the frequency of a seventh-order component by electric angle is 1400 Hz as shown in expression 25, and therefore the carrier frequency is set to be equal to or higher than 4200 Hz which is three times 1400 Hz.

If the carrier frequency fc is set to be equal to or higher than six times the frequency f7 of the seventh-order harmonic voltages v1uh_7*, v1vh_7*, and v1wh_7*, accuracy of the seventh-order harmonic voltage can be further improved in the voltage application means 302.

Figure 41:
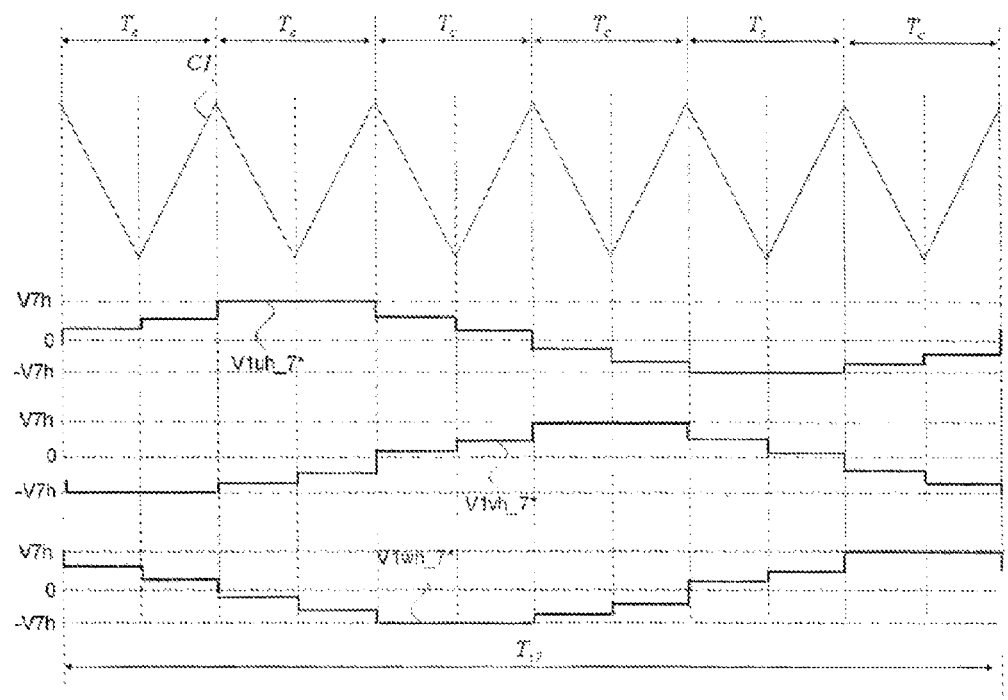
FIG. 41 is an explanation diagram showing a relationship between the carrier triangular wave and the seventh-order harmonic voltages contained in the voltage commands in the case where the frequency of the carrier triangular wave is increased, in embodiment 9 of the present invention.
Figure 42:
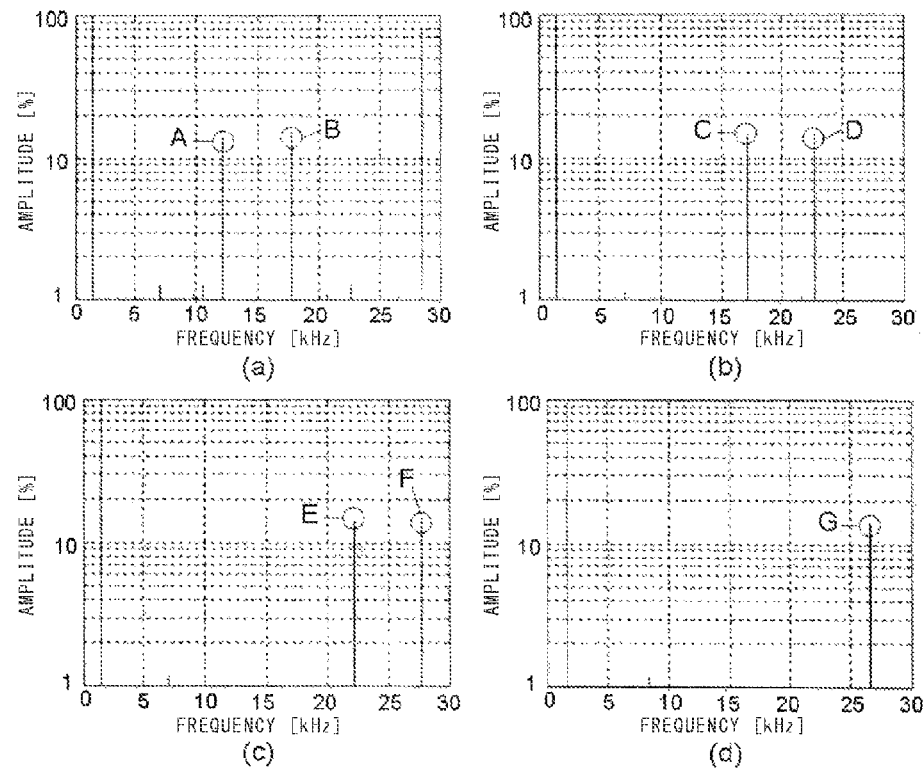
FIG. 42 is a graph showing a result of frequency analysis for inverter output voltage in the case where the frequency of the carrier triangular wave is changed, in embodiment 9 of the present invention.

FIG. 41 is a diagram showing the relationship between the carrier triangular wave C1 and the seventh-order harmonic voltages v1uh_7*, v1vh_7*, and v1wh_7* in the case where the frequency fc of the carrier triangular wave C1 is set at six times the frequency f7 of the seventh-order harmonic voltages v1uh_7*, v1vh_7*, and v1wh_7*.

In comparison between FIG. 40 and FIG. 41, the seventh-order harmonic voltages v1uh_7*, v1vh_7*, and v1wh_7* in FIG. 41 are closer to a sine waveform, so that the voltage application means 302 can output the seventh-order harmonic voltages v1uh_7*, v1vh_7*, and v1wh_7* with higher accuracy.

Here, a specific example of numerical values will be described.

In the case where the number of poles of the brushless motor 301 is 8 and the rotation rate is 3000 r/min, the frequency of the seventh-order harmonic voltage is 1400 Hz as shown in expression 25.

Therefore, the carrier frequency is set to be equal to or higher than 8400 Hz, that is, equal to or higher than six times 1400 Hz.

FIG. 42(a) to (d) shows a result of frequency analysis for inverter output voltage in the case where the frequency f7 of the seventh-order harmonic voltages v1uh_7*, v1vh_7*, and v1wh_7* is set at 1400 Hz and the carrier frequency is set at 15 kHz, 20 kHz, 25 kHz, and 30 kHz, respectively.

On the vertical axis, the amplitude of the seventh-order harmonic voltage is 100[%].

In (a), peaks slightly higher than 10% occur at A (about 12 kHz) and B (about 18 kHz).

These peaks occur in an audible frequency band (about 20 Hz to about 20 kHz), and therefore cause noise.

In (b), peaks slightly higher than 10% occur at C (about 17 kHz) and D (about 23 kHz).

The peak at C (about 17 kHz) occurs in the audible frequency band (about 20 Hz to about 20 kHz), and therefore causes noise.

In (c), peaks slightly higher than 10% occur at E (about 22 kHz) and F (about 27 kHz).

These peaks occur outside the audible frequency band (about 20 Hz to about 20 kHz), and therefore do not cause noise. In (d), a peak slightly higher than 10% occurs at G (about 27 kHz).

This peak occurs outside the audible frequency band (about 20 Hz to about 20 kHz), and therefore does not cause noise.

Thus, in the case where the carrier frequency is set at 15 kHz and 20 kHz, since peaks slightly higher than 10% occur in the audible frequency band, these peaks can be a source to cause noise, but in the case where the carrier frequency is set at 25 kHz and 30 kHz, since no peak occurs in the audible frequency band, no peak can be a source to cause noise.

It is known that, as the carrier frequency increases, switching loss of the power device increases and error in the inverter output voltage due to dead time increases.

Therefore, as long as no noise occurs in either case of setting the carrier frequency at 25 kHz or 30 kHz, it is preferable that the carrier frequency is set at 25 kHz, because the switching loss is greater and output voltage error due to dead time is greater in the case of 30 kHz.

Therefore, an upper limit value of the carrier frequency in the present embodiment is 25 kHz.

Thus, the frequency fc of the carrier triangular wave C1 is set to be not lower than 4200 Hz and not higher than 25 kHz, or more preferably, not lower than 8400 Hz and not higher than 25 kHz, whereby the voltage applicator 321 and the voltage applicator 322 can accurately output seventh-order harmonic voltages, and an effect of reducing switching loss and reducing error in the inverter output voltage is obtained while an effect relevant to improvement of the motor output is ensured.

The motor drive device of the present embodiment can be applied to a steering of a vehicle to configure an electric power steering device, whereby induced voltage having a trapezoidal waveform and applied voltage having a trapezoidal waveform can be outputted with high accuracy by the inverter. Therefore, an effect of reducing load on a driver is obtained.

Embodiment 10

Embodiment 10 will describe resolution of the voltage command outputted from the control means 303 of embodiments 3 to 8.

In the case where the control means 303 is realized by a CPU such as a microcomputer or a DSP (Digital Signal Processor), depending on resolution of the voltage command outputted from the control means 303, error due to quantization occurs in voltage applied by the voltage application means 302.

Figure 43:
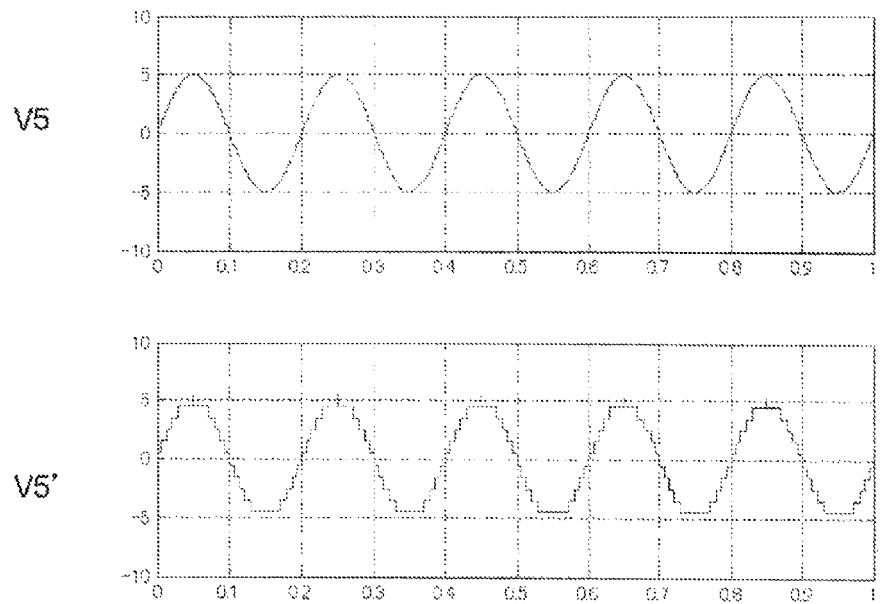
FIG. 43 is a waveform diagram showing an example of a temporal waveform of a fifth-order harmonic component contained in a voltage command in embodiment 10 of the present invention.

FIG. 43 shows an example of a temporal waveform of a fifth-order harmonic component contained in the voltage command. The horizontal axis indicates time, and the vertical axis indicates voltage.

V5 in an upper diagram is a waveform of a desired fifth-order harmonic component, and V5' in a lower diagram is a waveform obtained by setting resolution such that a division number thereof is ⅒ of the amplitude (p-p) of the fifth-order harmonic component in the upper diagram. A difference between both waveforms is error due to voltage resolution.

Figure 44:
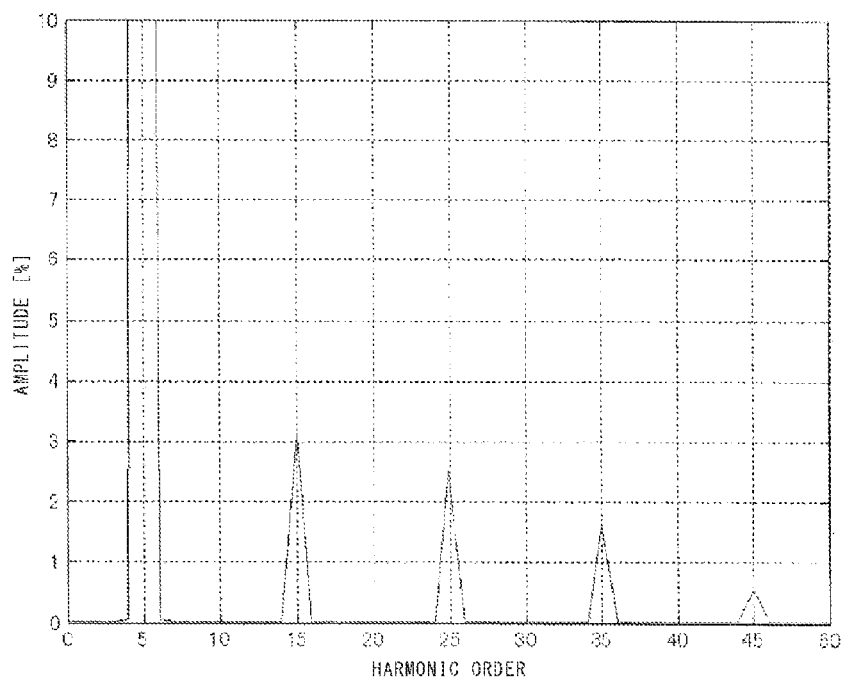
FIG. 44 is a graph showing a result of frequency analysis for the fifth-order harmonic component V5' in FIG. 43 in embodiment 10 of the present invention.

FIG. 44 shows a result of frequency analysis for V5'. The horizontal axis indicates harmonic orders contained in V5', and the vertical axis indicates an amplitude for each harmonic order in the case where the amplitude of a fifth-order harmonic component is defined as 100%.

As shown in FIG. 44, V5' contains harmonic components for fifteenth order, twenty-fifth order, thirty-fifth order, etc., in addition to the fifth-order harmonic component, and these harmonic voltages become a factor for vibration or noise occurring from the brushless motor.

Figure 45:
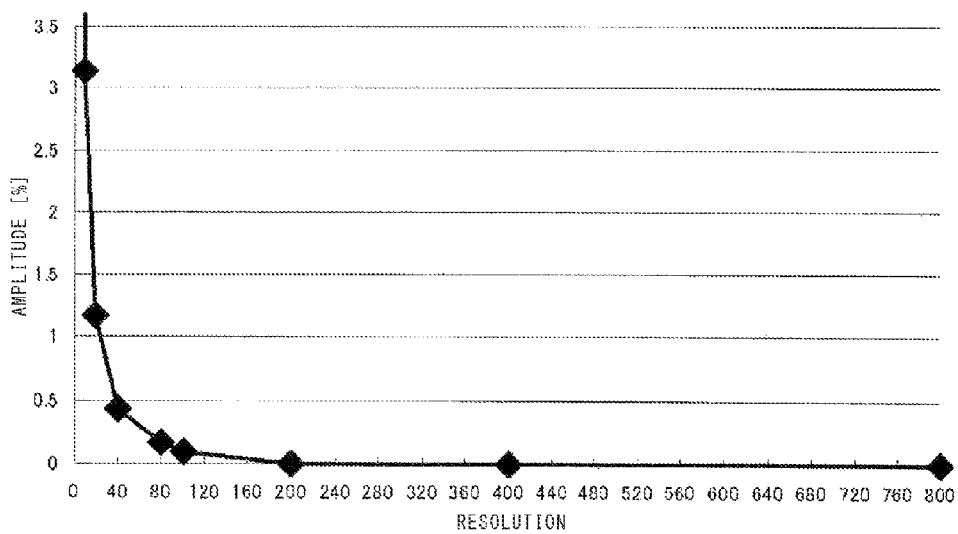
FIG. 45 is a graph showing a relationship between a division number for the amplitude of the fifth-order harmonic component, and the amplitude of a fifteenth-order harmonic component contained in the fifth-order harmonic component V5' in FIG. 43 in embodiment 10 of the present invention.

FIG. 45 is a graph plotted with the horizontal axis indicating a division number for the amplitude (p-p) of the fifth-order harmonic component and the vertical axis indicating an amplitude (percentage (%) with respect to fifth-order harmonic component) of a fifteenth-order harmonic component contained in V5'.

As shown in FIG. 45, the greater the division number is, the smaller the fifteenth-order harmonic component is, and at a voltage resolution in which the division number is roughly equal to or greater than 40, the fifteenth-order harmonic component is smaller than 0.5%, and thus is sufficiently reduced.

If the division number is further increased, the fifteenth-order harmonic component is further reduced. At the division number of 200 to 400, the fifteenth-order harmonic component is approximately zero, and this is further preferable. However, in the case where the division number exceeds 400, a result is saturated at approximately zero.

In view of the above and also the fact that an expensive CPU is needed if the division number increases, it is preferable to set the voltage resolution for the amplitude of the fifth-order harmonic component such that the division number thereof is not less than 40 and not more than 400.

Figure 46:
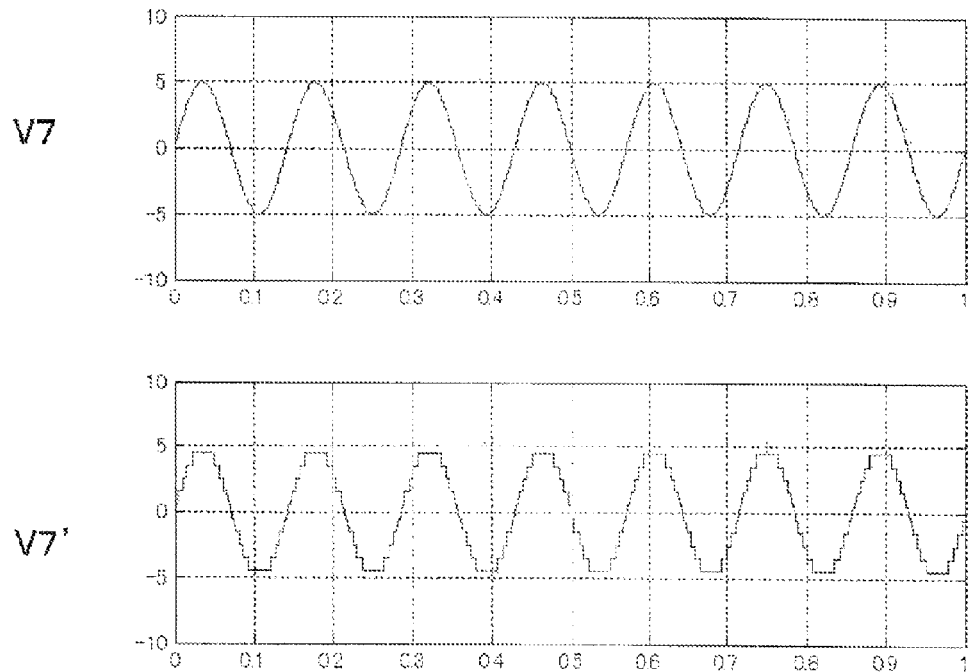
FIG. 46 is a waveform diagram showing an example of a temporal waveform of a seventh-order harmonic component contained in a voltage command in embodiment 10 of the present invention.

FIG. 46 shows a temporal waveform of a seventh-order harmonic component contained in the voltage command. The horizontal axis indicates time, and the vertical axis indicates voltage.

V7 in an upper diagram is a waveform of a desired seventh-order harmonic component, and V7' in a lower diagram is a waveform obtained by setting resolution for the amplitude (p-p) of the seventh-order harmonic component in the upper diagram such that a division number thereof is $1/10$.

Figure 47:
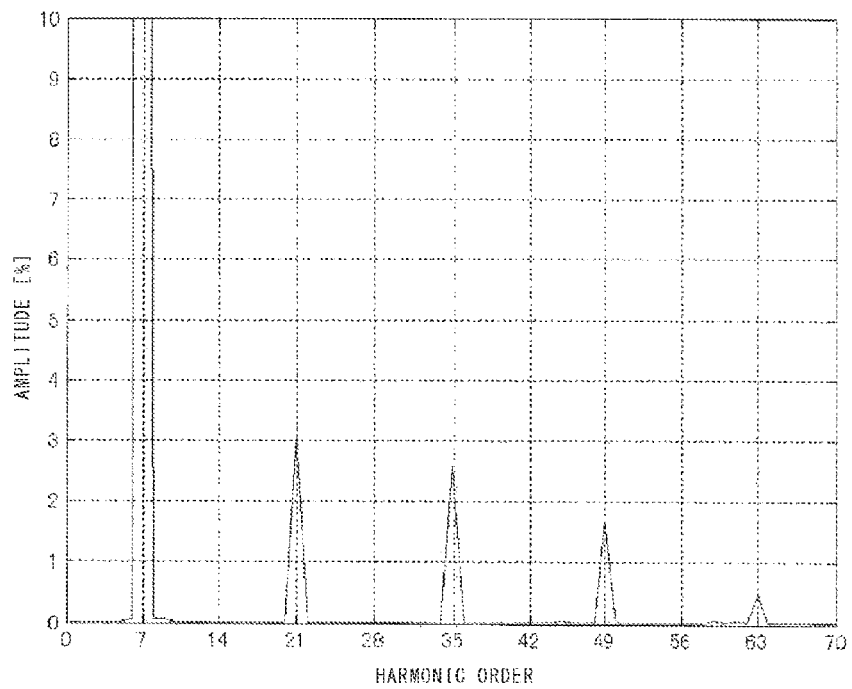
FIG. 47 is a graph showing a result of frequency analysis for the seventh-order harmonic component V7' in FIG. 46 in embodiment 10 of the present invention.

FIG. 47 shows a result of frequency analysis for V7'. The horizontal axis indicates harmonic orders contained in V7', and the vertical axis indicates an amplitude for each harmonic order in the case where the amplitude of a seventh-order harmonic component is defined as 100%.

As shown in FIG. 47, V7' contains harmonic components for twenty-first order, thirty-fifth order, forty-ninth order, etc., in addition to the seventh-order harmonic component, and these harmonic voltages become a factor for vibration or noise occurring from the multiplex winding motor.

Figure 48:
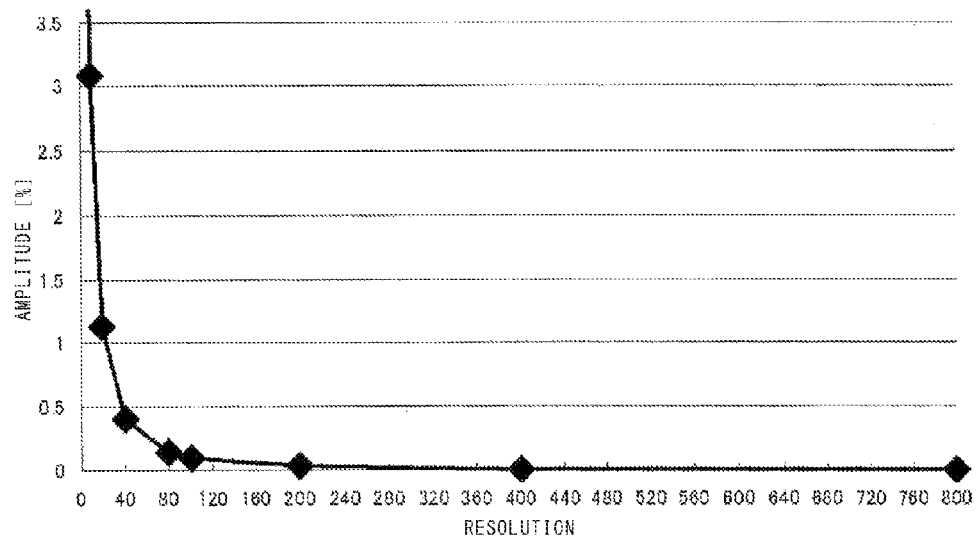
FIG. 48 is a graph showing a relationship between a division number for the amplitude of the seventh-order harmonic component, and the amplitude of a twenty-first-order harmonic component contained in the seventh-order harmonic component V7' in FIG. 46 in embodiment 10 of the present invention.

FIG. 48 is a graph plotted with the horizontal axis indicating a division number for the amplitude (p-p) of the seventh-order harmonic component and the vertical axis indicating an amplitude (percentage (%) with respect to seventh-order harmonic component) of a twenty-first-order harmonic component contained in V7'.

As shown in FIG. 48, the greater the division number is, the smaller the twenty-first-order harmonic component is, and at a voltage resolution in which the division number is roughly equal to or greater than 40, the twenty-first-order harmonic component is smaller than 0.5%, and thus is sufficiently reduced.

If the division number is further increased, the twenty-first-order harmonic component is further reduced. At the division number of 200 to 400, the twenty-first-order harmonic component is approximately zero, and this is further preferable. However, in the case where the division number exceeds 400, a result is saturated at approximately zero.

In view of the above and also the fact that an expensive CPU is needed if the division number increases, it is preferable to set the voltage resolution for the amplitude of the seventh-order harmonic component such that the division number thereof is not less than 40 and not more than 400.

Accordingly, in the present embodiment, for the amplitude of a fifth-order harmonic component or a seventh-order harmonic component, the voltage resolution is set such that a division number thereof is not less than 40 and not more than 400.

By setting the division number at 40 or more, it becomes possible to reduce a fifteenth-order harmonic component or a twenty-first-order harmonic component caused due to voltage resolution.

Even if the division number is set at a value exceeding 400, as shown in FIG. 45 and FIG. 48, the amplitude of a fifteenth-order harmonic component or a twenty-first-order harmonic component does not vary. Therefore, the division number is set at 400 or less in light of the cost of a CPU.

In the case where a fifth-order harmonic component and a seventh-order harmonic component are outputted at the same time, the voltage resolution may be set for a sum of the amplitudes of the fifth-order harmonic component and the seventh-order harmonic component such that the division number is not less than 80 and not more than 800.

Hereinafter, voltage resolution for a fundamental wave component will be described.

As shown in FIG. 32, when a sum of the amplitudes of the fifth-order and seventh-order harmonics on the horizontal axis is about 15%, increase in the fundamental wave component on the vertical axis is almost saturated. Therefore, in the case of assuming the maximum value of the amplitude sum to be 15% for calculation, the division number for the voltage output range (100%, a voltage range corresponding to a range from a valley bottom to a mountain top of a carrier wave) of the fundamental wave component may be set to be not less than 530 ($\approx 80 \times 100\%/15\%$) and not more than 5300 ($\approx 800 \times 100\%/15\%$).

As described above, for a fifth-order harmonic component or a seventh-order harmonic component, the voltage resolution is set such that a division number thereof is not less than 40 and not more than 400, whereby harmonic order components for fifteenth order, twenty-first order, etc. caused by superimposition of the fifth-order harmonic component or the seventh-order harmonic component can be reduced while the cost of a CPU is taken into consideration. In the case where the fifth-order harmonic component and the seventh-order harmonic component are outputted at the same time, for a sum of the amplitudes of the fifth-order harmonic component and the seventh-order harmonic component, the voltage resolution is set such that a division number thereof is 80 or greater, whereby other harmonic order components caused by superimposition of the fifth-order harmonic component and the seventh-order harmonic component can be reduced while the cost of a CPU is taken into consideration. Thus, a novel effect of reducing vibration and noise caused by the multiplex winding motor is provided.

The motor drive device of the present embodiment can be applied to a steering of a vehicle to configure an electric power steering device, whereby induced voltage having a trapezoidal waveform and applied voltage having a trapezoidal waveform can be accurately outputted from the inverter. Therefore, effects are obtained in which load on a driver can be reduced and vibration and noise due to carrier frequency components caused by the multiplex winding motor can be reduced, whereby steering vibration and noise that the driver feels can be reduced.

Embodiment 11

Figure 49:
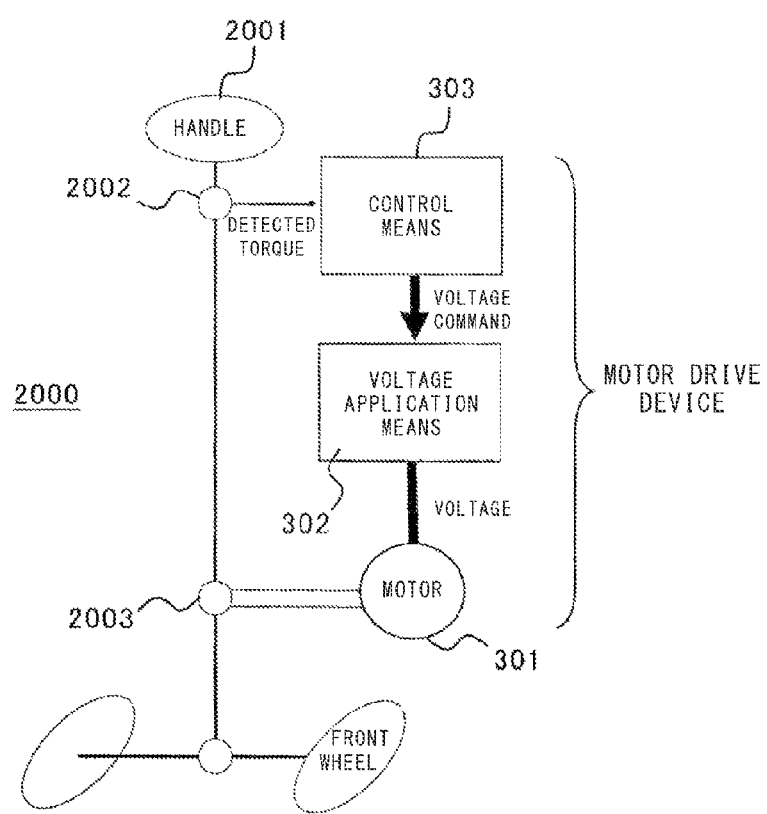
FIG. 49 is a schematic configuration diagram showing an electric power steering device according to embodiment 11 of the present invention.

FIG. 49 is a diagram showing an electric power steering device 2000 configured to generate assist torque by the motor drive devices of embodiments 1 to 10.

A driver turns a handle 2001 to the right or the left, to steer front wheels.

Torque detection means 2002 detects steering torque of a steering system and outputs the detected torque to the control means 303.

The control means 303 calculates a voltage command so that the motor 301 generates torque for assisting the steering torque of the steering system, and outputs the voltage command to the voltage application means 302.

The voltage application means 302 applies voltage to the motor 301 based on the voltage command, and the motor 301 generates torque for assisting the steering torque via a gear 2003.

In the electric power steering device having the motor drive device according to the present embodiment, since torque ripple of the motor is reduced, pulsation that a driver feels when steering a handle is reduced, whereby steering feeling for the driver can be improved and sound during steering can be reduced.

In addition, the voltage application means can be designed such that the withstand voltage against induced voltage applied from the motor is lowered. Therefore, the size and the weight of the voltage applicators can be reduced, so that the size and the weight of the electric power steering device can be reduced.

In addition, since output of the motor drive device is improved and a magnet amount per unit torque can be reduced, the size and the weight of the electric power steering device can be reduced, rated torque needed when end-abutment steering is performed can be improved.

It is noted that, within the scope of the present invention, the above embodiments may be freely combined with each other, or each of the above embodiments may be modified or abbreviated as appropriate.

DESCRIPTION OF THE REFERENCE CHARACTERS 301 brushless motor, 302 voltage application means, 303 control means, 305 current detection means, 306 magnetic pole position detector, 310 armature iron core, 311 first winding set, 312 second winding set, 313 field pole iron core, 313a salient pole portion, 313b protrusion, 313c magnet hole, 313d salient pole portion, 314 permanent magnet, 315 voltage amplitude command calculator, 316 integrator, 317, 318 three-phase voltage command calculator, 321, 322 voltage applicator, 331 current command calculator, 332, 333 three-phase/two-phase converter, 334, 335 coordinate converter A, 336, 337 current controller A, 338, 339 coordinate converter B, 340, 341 two-phase/three-phase converter, 342, 343 harmonic calculator A, 601, 602 harmonic calculator B, 431, 432 harmonic calculator C, 344, 345 third-order harmonic superimposing device, 700 failure detection means, 1001 DC voltage source, 1002, 1003 ON/OFF signal generation section, 2000 electric power steering device

The invention claimed is:

1. A motor drive device comprising:
    a multiplex winding motor having an armature iron core wound with armature windings including a plurality of winding sets each of which includes windings for a plurality of phases;
    voltage application means for applying voltages to the plurality of winding sets; and
    control means for calculating a voltage command for the plurality of winding sets and controlling the voltage application means based on the voltage command, wherein
    the control means controls the voltage application means so that induced voltages generated in the plurality of winding sets by rotation of the multiplex winding motor each have a trapezoidal waveform, and a phase difference between the voltages for the plurality of winding sets becomes a value that reduces torque ripple caused by the induced voltages.

2. The motor drive device according to claim 1, wherein the phase difference has a value obtained by dividing 60 degrees by a divisor of the number of the winding sets excluding 1.

3. The motor drive device according to claim 2, wherein, in a case where the number of the winding sets is four, the phase difference is 15 degrees for each winding set or 30 degrees on a two-set basis.

4. The motor drive device according to claim 1, wherein
    the multiplex winding motor has field poles having a plurality of permanent magnets fixed at a surface of a field pole iron core, and
    h2/h1 is 0.65 to 1.0, where h1 is a thickness at a center of each permanent magnet and h2 is a thickness at an end of each permanent magnet.

5. The motor drive device according to claim 4, wherein the field poles have, between the permanent magnets, protrusions that protrude from a surface at which the permanent magnets are fixed, in a direction from a center of the field pole iron core toward the armature iron core.

6. The motor drive device according to claim 1, wherein
    the multiplex winding motor has field poles having a plurality of permanent magnets fixed at a surface of a field pole iron core,
    in the field poles, the plurality of permanent magnets are fixed by being inserted into magnetic holes provided inside the field pole iron core, and
    in a case where a distance from a center of the field pole iron core to a farthest point of the field pole iron core is Rc, an outer circumference of the field pole iron core has, in a most region thereof, approximately an arc shape with a radius Rm, and Rm/Rc is 0.5 to 1.0.

7. The motor drive device according to claim 1, wherein
    the multiplex winding motor has field poles at a surface of a field pole iron core,
    the field poles have permanent magnet portions as first field poles and salient pole portions as second field poles having a polarity opposite to that of the first field poles,
    the first field poles and the second field poles are respectively arranged at regular intervals in a circumferential direction of the field pole iron core, and
    in a case where an angle occupied in the circumferential direction of the field pole iron core by a pair of N pole and S pole of the field poles is defined as an electric angle of 360 degrees, a coil pitch of the windings is 180 degrees.

8. The motor drive device according to claim 1, wherein
    the induced voltages each have a waveform containing, on a fundamental wave component thereof, a fifth-order harmonic component having a frequency component five times as high as that of the fundamental wave component of the induced voltage, and a seventh-order harmonic component having a frequency component seven times as high as that of the fundamental wave component of the induced voltage, at least one of the fifth-order harmonic component and the seventh-order harmonic component being superimposed so as to satisfy a predetermined phase difference condition and a predetermined amplitude condition that allow a peak of the fundamental wave component of the induced voltage to be higher than a peak of the induced voltage.

9. The motor drive device according to claim 8, wherein, in a case where one cycle of a harmonic component is defined as 360 degrees, the fifth-order harmonic component has a phase difference by 150 degrees to 210 degrees with respect to the fundamental wave component of the induced voltage, and a ratio of an amplitude of the fifth-order harmonic component to an amplitude of the fundamental wave component of the induced voltage is 2 to 12%.

10. The motor drive device according to claim 8, wherein, in a case where one cycle of a harmonic component is defined as 360 degrees, the fifth-order harmonic component and the seventh-order harmonic component each have a phase difference by 120 degrees to 240 degrees with respect to the fundamental wave component of the induced voltage, and a ratio of a sum of amplitudes of the fifth-order harmonic component and the seventh-order harmonic component to an amplitude of the fundamental wave component of the induced voltage is 2% to 36%.

11. The motor drive device according to claim 1, wherein the control means calculates a current command indicating a value of current to flow in the armature windings, based on desired torque, and has a control loop for calculating the voltage command based on the current command, with a band of control response in the control loop set to be lower than 1200 Hz.

12. The motor drive device according to claim 1, wherein the phase difference has a value that reduces torque ripple caused by the induced voltages and torque ripple caused by voltage or current having a trapezoidal waveform applied based on the voltage command.

13. The motor drive device according to claim 12, wherein the voltage command or the current having the trapezoidal waveform is generated by at least one of a fifth-order harmonic component and a seventh-order harmonic component being superimposed on a fundamental wave component having a sine waveform.

14. The motor drive device according to claim 13, wherein the control means calculates the voltage command in a rotational coordinate system, and the voltage command is generated by a sixth-order harmonic component being superimposed on the fundamental wave component having the sine waveform.

15. The motor drive device according to claim 13, wherein the control means calculates the voltage command based on a current command in a rotational coordinate system, and the current command is generated by a sixth-order harmonic component being superimposed on the fundamental wave component having the sine waveform.

16. The motor drive device according to claim 13, wherein resolution of the voltage command has a value that causes an amplitude of the fifth-order harmonic component or the seventh-order harmonic component to be divided into 40 to 400.

17. The motor drive device according to claim 13, wherein resolution of the voltage command has a value that causes a sum of amplitudes of the fifth-order harmonic component and the seventh-order harmonic component to be divided into 80 to 800.

18. The motor drive device according to claim 13, wherein resolution of the voltage command has a value that causes an output range of the fundamental wave component to be divided into 530 to 5300.

19. The motor drive device according to claim 1, wherein the control means performs detection of current flowing in the armature windings, with a cycle of 350 µs or shorter.

20. The motor drive device according to claim 19, wherein the control means performs the detection of current flowing in the armature windings, with a cycle of 140 µs or shorter.

21. The motor drive device according to claim 1, wherein
the voltage application means applies voltage to the armature windings based on the voltage command and a carrier wave, and
a frequency of the carrier wave is set at 4200 Hz or higher.

22. The motor drive device according to claim 1, wherein
the voltage application means applies voltage to the armature windings based on the voltage command and a carrier wave, and
a frequency of the carrier wave is set at 8400 Hz or higher.

23. The motor drive device according to claim 1, wherein
the voltage application means includes failure detection means for, when one of a plurality of systems corresponding to the plurality of winding sets has failed, specifying the failed system, and
output of the failed system specified by the failure detection means is stopped and output of a normal system that has not failed is continued.

24. An electric power steering device comprising the motor drive device according to claim 1, thereby generating assist torque.

* * * * *